(12) United States Patent
Szewczyk et al.

(10) Patent No.: US 10,047,808 B2
(45) Date of Patent: Aug. 14, 2018

(54) WHEEL WITH MOTOR AND VEHICLE BRAKING DEVICE

(71) Applicant: FRENI BREMBO S.p.A., Curno (IT)

(72) Inventors: Beniamin Szewczyk, Curno (IT); Paolo Sala, Curno (IT); Riccardo Arrigoni, Curno (IT); Cristian Crippa, Curno (IT); Andrea Milanesi, Curno (IT); Alessandro Ciotti, Curno (IT)

(73) Assignee: Freni Brembo S.P.A. (IT)

( * ) Notice: Subject to any disclaimer, the term of this patent is extended or adjusted under 35 U.S.C. 154(b) by 36 days.

(21) Appl. No.: 15/106,729

(22) PCT Filed: Dec. 18, 2014

(86) PCT No.: PCT/IB2014/067089
§ 371 (c)(1),
(2) Date: Jun. 20, 2016

(87) PCT Pub. No.: WO2015/092743
PCT Pub. Date: Jun. 25, 2015

(65) Prior Publication Data
US 2017/0058975 A1    Mar. 2, 2017

(30) Foreign Application Priority Data

Dec. 20, 2013 (IT) .............................. MI2013A2159
Dec. 20, 2013 (IT) .............................. MI2013A2160
(Continued)

(51) Int. Cl.
*F16D 65/00* (2006.01)
*F16D 55/225* (2006.01)
(Continued)

(52) U.S. Cl.
CPC .......... *F16D 55/225* (2013.01); *B60B 25/004* (2013.01); *B60K 7/0007* (2013.01);
(Continued)

(58) Field of Classification Search
CPC ................... F16D 55/225; F16D 65/12; F16D 2065/1384; F16D 2065/1364;
(Continued)

(56) References Cited

U.S. PATENT DOCUMENTS 1,952,404 A * 3/1934 Woodward ................ B60B 3/04
152/378 W
5,826,948 A * 10/1998 Schroeder ............... B60B 3/002
301/64.303
(Continued)

FOREIGN PATENT DOCUMENTS

DE  102010049622 A1  6/2011
EP      1380459 A1    1/2004
(Continued)

OTHER PUBLICATIONS

Italian International Search Report dated Jul. 20, 2015 in corresponding PCT Patent Application No. PCT/IB2014/067089.
(Continued)

*Primary Examiner* — Pamela Rodriguez
(74) *Attorney, Agent, or Firm* — Waller Lansden Dortch & Davis LLP; Matthew C. Cox

(57) ABSTRACT

A wheel assembly for a vehicle includes a wheel rim suitable to rotate around an axis of rotation (a-a), defining an axial direction (A-A) parallel or coincident with the axis of rotation (a-a), an orthogonal radial direction (R-R), and a circumferential direction locally coincident with a tangential direction (T-T) orthogonal to the axial direction (A-A) and the radial direction (R-R), the wheel rim having a radially outer side, opposite the axis of rotation (a-a), and a radially
(Continued)

inner side facing the axis of rotation (a-a), the rim being suitable to receive externally a tire, and wherein the wheel rim forms internally a cylindrical chamber of the rim delimited radially from the inner side; a motor comprising a rotor and a stator; the rotor being supported, free to rotate, on the stator; said stator being fixed to a stator support; the motor being housed in the cylindrical wheel rim chamber of the wheel rim; the rotor is selectively, removably and rigidly connected to the inner side of the wheel rim, avoiding the interposition of elastic members or damping members.

8 Claims, 16 Drawing Sheets

(30) Foreign Application Priority Data

Dec. 20, 2013 (IT) .............................. MI2013A2161
Dec. 20, 2013 (IT) .............................. MI2013A2162

(51) Int. Cl.
*B60K 7/00* (2006.01)
*B60B 25/00* (2006.01)
*F16D 65/12* (2006.01)
*F16D 65/02* (2006.01)
*B60K 11/02* (2006.01)
*B60K 1/00* (2006.01)

(52) U.S. Cl.
CPC .............. *F16D 65/12* (2013.01); *B60K 11/02* (2013.01); *B60K 2001/006* (2013.01); *B60K 2007/0038* (2013.01); *B60K 2007/0092* (2013.01); *F16D 2065/1364* (2013.01); *F16D 2065/1384* (2013.01)

(58) Field of Classification Search
CPC ................ B60B 25/004; B60K 7/0007; B60K 2007/0038; B60K 2007/092; B60K 11/02; B60K 2001/006

USPC ..... 188/73.1, 71.1, 71.6, 72.4, 73.31, 264 R, 188/264 A, 264 AA; 301/11.1–11.3, 13.2, 301/31, 64.704

See application file for complete search history.

(56) References Cited

U.S. PATENT DOCUMENTS

| | | | |
|---|---|---|---|
| 6,869,149 B2* | 3/2005 | Tanaka | B60B 3/005 29/894.322 |
| 8,919,890 B2* | 12/2014 | Anca | B60B 3/002 301/63.103 |
| 9,073,425 B2* | 7/2015 | Vogler | B60K 7/0007 |
| 2008/0070736 A1* | 3/2008 | Yoshino | B60K 7/0007 475/149 |
| 2016/0121709 A1* | 5/2016 | Shin | B60K 7/0007 301/6.5 |

FOREIGN PATENT DOCUMENTS

| | | |
|---|---|---|
| JP | 2003300420 A | 10/2003 |
| JP | 2005337355 A | 12/2005 |
| JP | 2006057732 A | 3/2006 |
| JP | 2008024148 A | 2/2008 |
| JP | 4486443 B2 | 6/2010 |
| JP | 5110854 B2 | 12/2012 |
| KR | 20100083521 A | 7/2010 |
| WO | 9401917 A1 | 1/1994 |
| WO | 2005000621 A1 | 1/2005 |
| WO | 200814517 A1 | 11/2008 |

OTHER PUBLICATIONS

Italian Written Opinion dated Jul. 20, 2015 in corresponding PCT Patent Application No. PCT/IB2014/067089.

* cited by examiner

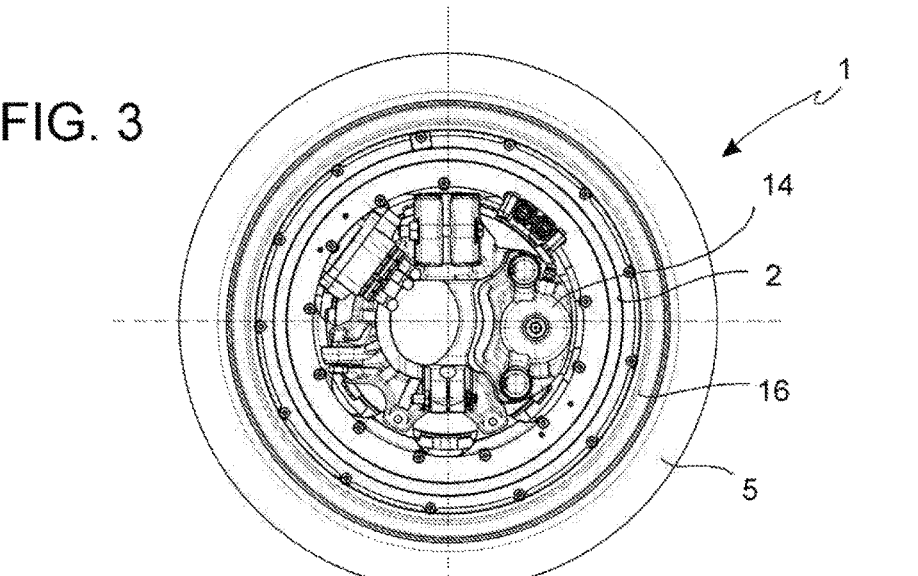
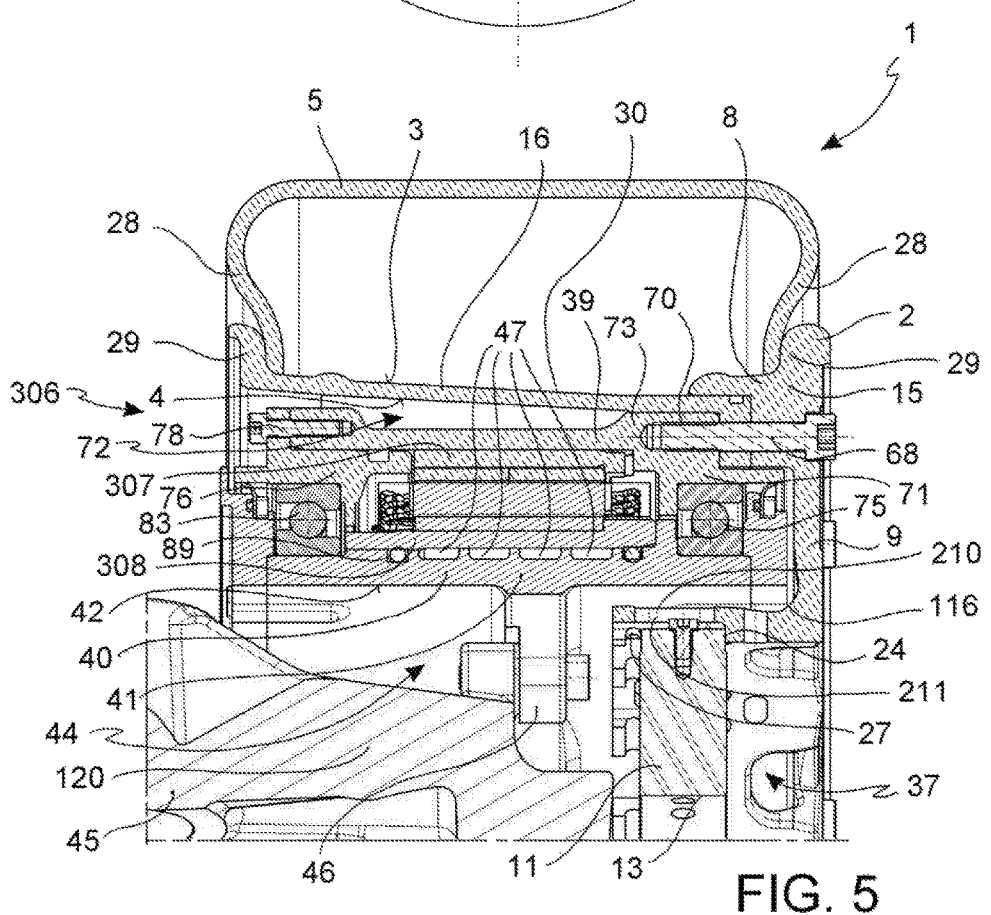

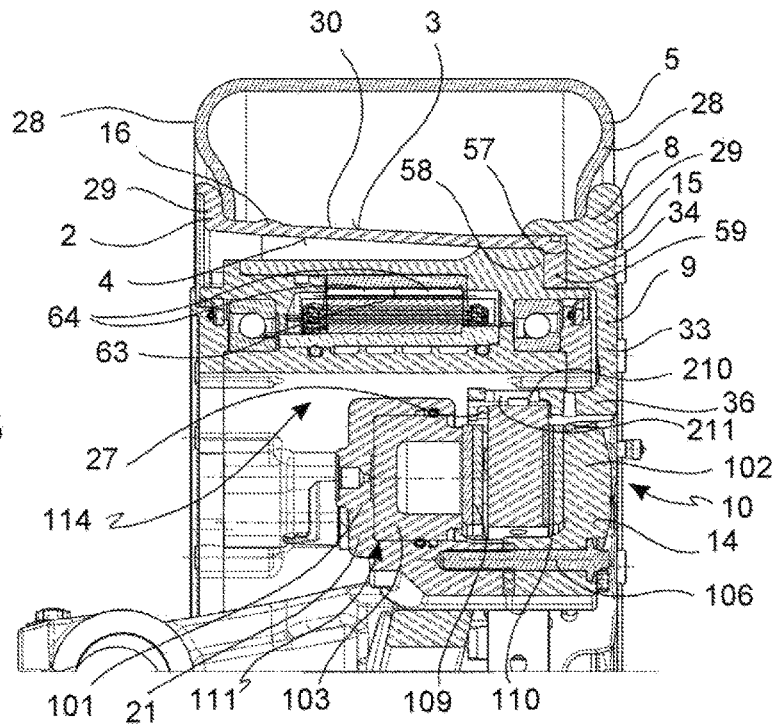

WHEEL WITH MOTOR AND VEHICLE BRAKING DEVICE

FIELD OF THE INVENTION

This invention refers to a vehicle wheel assembly comprising a wheel rim, a motor and a vehicle braking device.

In particular, this invention refers to a vehicle wheel assembly comprising a wheel rim with, inside, an electric motor and a vehicle braking device.

STATE OF THE ART

Vehicle wheels comprising an electric motor located inside the wheel (In-Wheel Motor System) are solutions intended to obtain the direct transmission of motion to the wheel rim and realize efficient vehicles, as well as to reduce the number of motion components and increase the transmission efficiency of the driving force.

Solutions of this type have long been known, such as the Lohner-Prosche motor car with steering wheels and electric motor developed around 1896 and exhibited at the Porsche Museum in Stuttgart, Baden-Württemberg, Germany (see: http://www.porsch.com/international/aboutporsch/responsibility/environment/hybrid/lohner/ and http://www.porsche.com/museum/de/).

Document WO2008/144517 of MATERIALWERKS LLC shows a wheel apparatus with propulsion system for alternately speeding up or slowing down the rotation of a wheel that supports an automobile. An electric motor is fixed to the vehicle structure and connected to the wheel to generate the driving force. This electric motor comprises a radially-supported motor stator suitable to be fixed to the vehicle. The electric motor also comprises a motor rotor that is also radially supported, facing the stator, and connected to the wheel hub of the vehicle.

This known solution, while presenting a motor housed inside the wheel rim, is difficult to apply to industrial production primarily because it proposes a solution that completely occludes the space inside of the wheel rim, not only making maintenance complex but also reducing the operating efficiency of the motor, which is difficult to adequately cool. Moreover, the radial arrangement of the stator and rotor support requires very tight assembly tolerances and, in any case, result in a motor that is very susceptible to stresses from the tyre, amplifying any disturbance to the air gap of the motor, for example, every vibration induced by the collision of the tyre with an obstacle on the road is transmitted, at times amplified, to the air gap of the motor.

Moreover, the solution proposed in this document also shows a connection of the wheel rim, motor and also the brake directly to the central hub of the suspension, completely occupying the little space inside the wheel rim and making the solution not only complex, but also extremely laborious to maintain.

Document KR20100083521 of WIA CORP. shows a motor housed inside a wheel rim in a similar way to the previous solution, centrally supporting the wheel rim, motor and brake disc.

This solution, albeit simpler than the previous one, is however very bulky and does not, in any way, reduce the complexity of maintenance. For example, to replace the brake disc, it is necessary, in addition to removing the wheel from the hub, to disconnect the rotor from the hub to then access the brake disc.

Another embodiment, in this same document, shows a brake disc supported directly by the wheel rim, which also forms the support for the rotor in a single piece.

Even this embodiment, although much simpler than the preceding one and, therefore, less bulky, does not, in any way, simplify the complexity of maintenance by requiring, for example, the replacement of the rotor whenever there is even minimal deformation of the wheel rim. Moreover, this solution is even more sensitive to disturbances, such as vibrations, generated or induced by the rolling of the wheel on the road, disturbances that are transmitted directly to the rotor, which is entirely made with its support in a single piece with the wheel rim.

Document JP2005337355 of Honda Motor Co. Ltd., shows a wheel rim to which a rotor is solidly connected. This rotor rigidly supports a disc for a disc brake. The rotor is rotatably connected to the stator which is connected to the arms of a suspension. A floating disc brake caliper is rigidly connected to the stator and placed astride the brake disc.

This solution, as depicted, is impossible to implement since, on the one hand, the connection of the floating caliper to the stator prevents it from moving to adjust to the wear of the pads while, on the other hand, the disc is prevented from moving by being rigidly fixed to the rotor. Moreover, the rigid connection of the disc to the stator requires the stator itself to have a complex shape.

Similarly, in case of maintenance of the brake system, the connection of the floating caliper to the stator also requires removing the wheel from the suspension and the wheel rim from the rotor, in order to access the connection points of the caliper to the stator.

In fact, this solution makes maintenance extremely complex to perform.

Document JP5110854 of NTN TOYO Bearing Co. Ltd., shows a wheel rim, inside of which a bearing is rigidly connected, with a disc for a disc brake solidly fixed at the same connection point.

There are a rotor and stator directly formed in one piece with the outer and inner thrust blocks of the bearing. The arms of the suspension are connected to the stator. The floating caliper of the braking device is also connected to the stator.

This known solution, in addition to being always very bulky, is extremely complex, if not impossible, to maintain. In fact, in the case of maintenance to the braking device or motor, since the caliper body is firmly fixed to the inner thrust block of the bearing and, at the same time, since the caliper is fitted on the disc, the disc cannot be extracted and the caliper body separated, without completely removing the wheel rim, motor and brake assembly and, in some cases, even the suspension.

Moreover, the cantilevered arrangement of the connection between the thrust blocks of the bearing and the fixing of the disc brake disc also to the same connection point, results in the direct transmission of disturbances from the rolling of the wheel on the road to the motor, as well as the transmission of disturbances of the braking action through the brake disc to the motor.

Document WO2005000621 of Toyota Motor Co. Ltd., shows a wheel rim to the outer edge of which is fixed the rotor of an electric motor pivotally connected with a stator fixed to the arms of the vehicle's suspension. The outer edge of a disc brake disc is fixed to the stator and a brake caliper, also fixed to the stator, is fitted astride it.

This known solution reduces the construction complexity of the wheel, motor and brake assembly but does not solve the maintenance problems.

In fact, to access the brake pads, or to replace the brake disc, it is necessary to remove substantially the entire assembly and access the internal screws fixing the caliper to the stator.

Moreover, the direct connection of the disc for a disc brake to the stator, transmits to the motor, and in particular to the air gap, all unwanted braking stresses, influencing the behaviour of the motor.

Documents JP2008024148 of SUGAI SOGYO KK, JP4486443 of Honda Motor Co., and JP2003300420 of SHIMIZU HIROSHI, present solutions substantially similar to the previous ones and, therefore, do not propose any variant capable of resolving the problems of bulk and, at the same time, simplicity of maintenance encountered so far.

Documents EP1380459 of BRIDGESTONE CORP and KR10112773 of PARK WON SUK, also show solutions with electric motors and braking devices inserted inside a wheel rim and all supported by the wheel hub. These last two solutions are distinguished from the previous ones for the provision of elastic and damping members interposed between the wheel rim and the rotor and between the stator and the stator support connected to the wheel hub, in order to provide a suspension for the motor that behaves like an anti-seismic device, i.e., a device capable of filtering vibrations coming from the support and, thus, from the road, if of high frequency. These elastic and damping members filter stresses from the wheel rim and avoid vibrations that could affect the behaviour of the motor while driving the vehicle.

These solutions, although capable of resolving a serious problem for the efficient functioning of the motor, do not resolve and, in fact, worsen, the possibility of having structural simplicity and ease of maintenance, making it, in fact, impossible to replace the motor without replacing the entire wheel rim, motor and caliper body assembly.

Solution

Therefore, it is particularly important to design a wheel rim, motor and braking device assembly that is compact and simple to manufacture while, at the same time, making it easy to maintain those components that require frequent service such as brake pads, the brake disc and the wheel rim as well as those components that are more rarely serviced, such as the electric motor.

Therefore, the purpose of this invention is to propose an assembly that meets the above-mentioned needs as well as solving the drawbacks of the prior art mentioned so far.

These and other purposes are achieved by a wheel assembly according to claim 1 and by a method of use or maintenance according to claim 8.

Some advantageous embodiments are the object of the dependent claims.

According to a general aspect of this invention, a wheel assembly for a vehicle, comprises a wheel rim suitable to rotate around an axis of rotation, defining an axial direction parallel to, or coincident with, said axis of rotation, an orthogonal radial direction and a circumferential direction, locally coincident with a tangential direction, orthogonal to the axial direction and the radial direction.

Said wheel rim presents a radially outer side, or outer side, opposite to the axis of rotation, and a radially inner side, or inner side, facing the axis of rotation.

Said wheel rim is suitable to externally receive a tyre and, internally forms a cylindrical wheel rim chamber radially delimited by said inner side.

In addition, said assembly comprises a motor with a rotor and a stator.

Said rotor is supported, free to rotate, on said stator. Said stator is fixed to a stator support.

Said motor is advantageously housed in the said cylindrical wheel rim chamber of said wheel rim.

Additionally, said rotor is selectively and removably connected rigidly to the inner side of said wheel rim, avoiding the interposition of elastic members or damping members between said rotor and said wheel rim.

In addition, said assembly comprises a braking device.

Said braking device comprises a disc brake disc having a radially outer edge and a radially inner edge.

Advantageously, said braking device comprises a disc brake caliper selectively and removably connected, directly or indirectly, to said stator support.

Said disc brake caliper is placed with its active part astride the inner edge of said disc brake disc.

In accordance with an advantageous embodiment, said wheel rim is made in two parts selectively and removably connected with each other to form a wheel rim body.

Advantageously, one of the two parts of said wheel rim forms in a single piece at least one spoke that protrudes radially towards the axis of rotation.

With further advantage, said disc is connected with its outer edge to said at least one spoke.

Thanks to the provision of a wheel rim made in two parts separable from each other, it is possible to maximize the space inside the wheel rim for the installation of a motor with a larger diameter than a motor installable in a wheel rim of the equal diameter but made as a single piece. Consequently, the provision of a greater motor diameter allows greater motor efficiency. In fact, the single-piece wheel rims of the prior art (both alloy and sheet metal) have a geometry of their central area that, in order to allow the mounting of the tyre with standard tyre repairer tools, must provide a sunken portion that decreases the accessibility and capacity of their central area inside the channel of the tyre. In other words, the geometry of these known single-piece wheel rims "sacrifices" the volume inside the wheel rim and, therefore, the motor that would be inserted would, in any case, be of a diameter smaller than that of the same wheel rim made, as proposed here, in two parts.

Thanks to the provision of the characteristics of the assembly according to the invention, it is possible to obtain a product of simple construction that, at the same time, has very small dimensions and, consequently, large space inside the wheel for its connection to the suspension and, possibly, the steering.

Moreover, thanks to the characteristics of the assembly according to the invention, it is possible to provide wide openings for the passage of air for cooling both the motor and braking device.

Advantageously, the characteristics of the assembly according to the invention are extremely simple to maintain, being easily and separately inspectable and accessible.

In particular, thanks to the characteristics of the assembly according to the invention, it is possible to separate and maintain the wheel rim without having to remove, or in any case, access the components of the motor, making inspection and maintenance very safe even for personnel that do not have expertise with motors, for example, electric motors.

Thanks to the characteristics of the assembly according to the invention, it is also possible to separate and maintain the brake disc and/or pads and, therefore, the more frequently serviced components of the braking device, without having to remove, or in any case, access the components of the motor, making inspection and maintenance very safe even for personnel that do not have expertise with motors, for example, electric motors.

FIGURES

Further characteristics and advantages of the assembly according to the invention will appear in the following description of its preferred embodiments, provided by way of non-limiting example, with reference to the annexed figures, wherein:

FIG. 3 is a view of the assembly of FIG. 1 from the vehicle side;

FIG. 5 is an enlarged detail of the section of FIG. 4;

Figure 9:
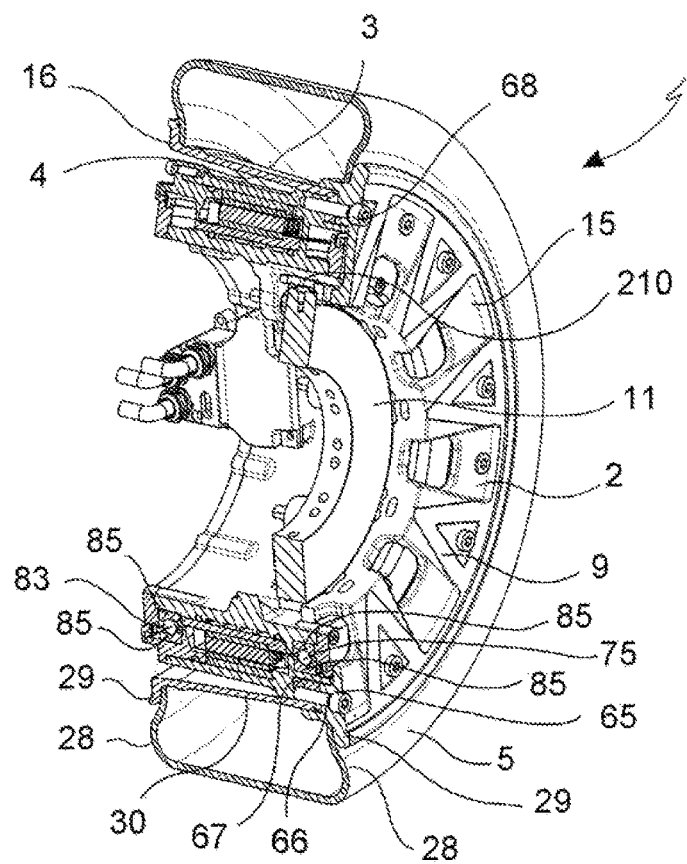
Figure 10:
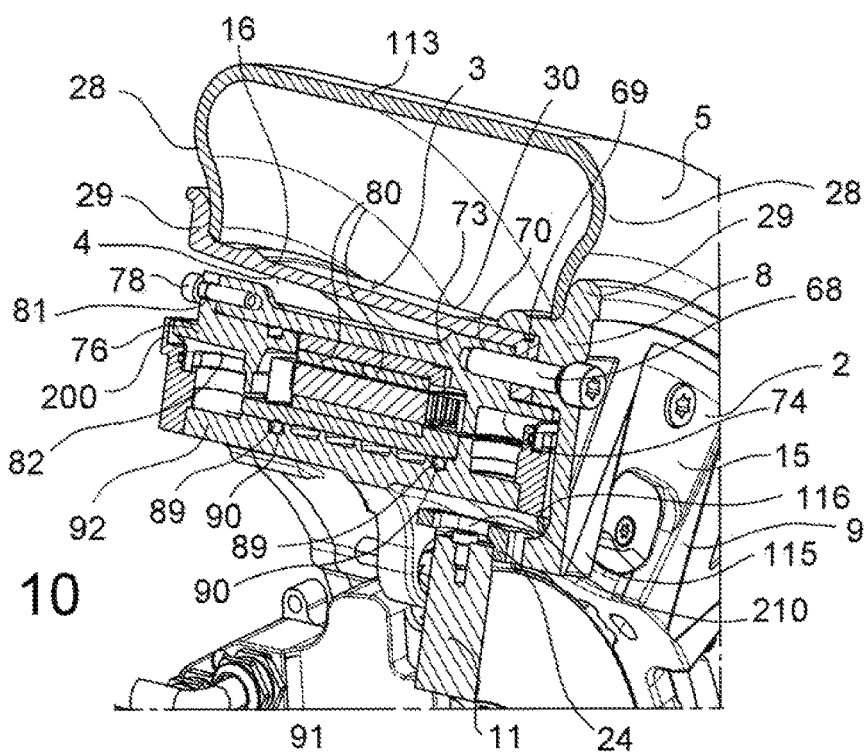

FIG. 9, in an axonometric view partially sectioned along the section planes passing through the axis of rotation of the wheel rim and having angle as defined below, represents a wheel assembly comprising a wheel rim on which is mounted a tyre, a braking device and an electric motor according to a further embodiment, wherein the angle of section highlights the connection devices of the wheel rim to the rotor of the electric motor and the connecting devices of the two parts of the wheel rim;

FIG. 10 represents, in a partially-sectioned axonometric view, a detail of the assembly of FIG. 9.

Figure 1:
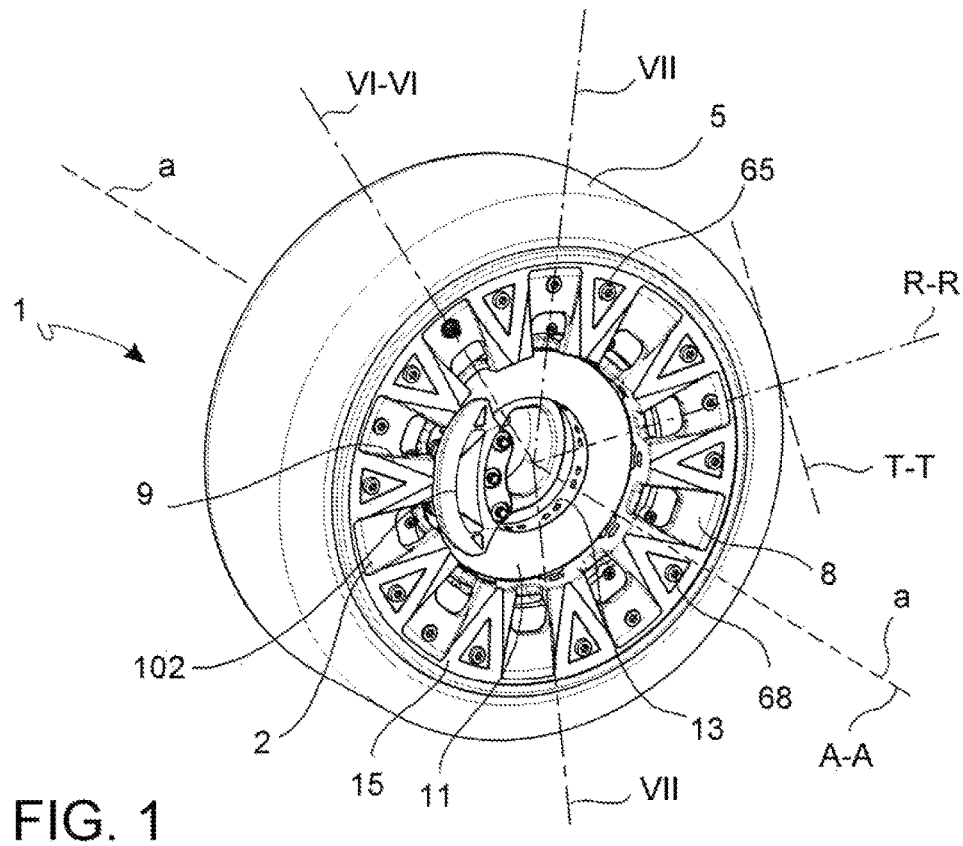
FIG. 1 represents, in an axonometric view from the side external to the vehicle, a wheel assembly comprising a wheel rim on which a tyre is mounted and inside of which a braking device and an electric motor are housed.
Figure 2:
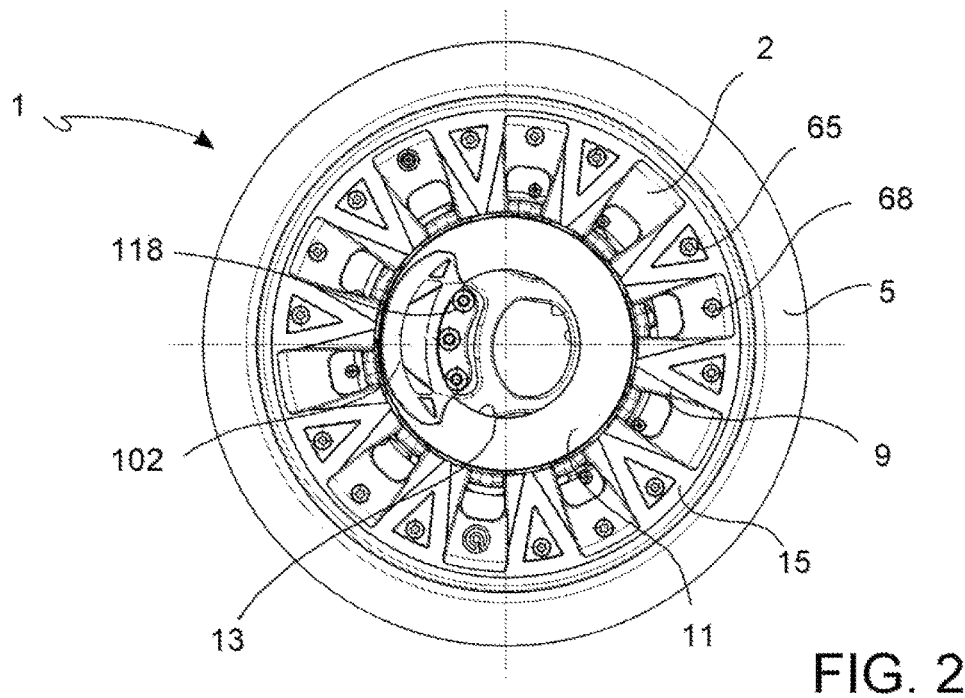
FIG. 2 is a front view of the assembly of FIG. 1.
Figure 4:
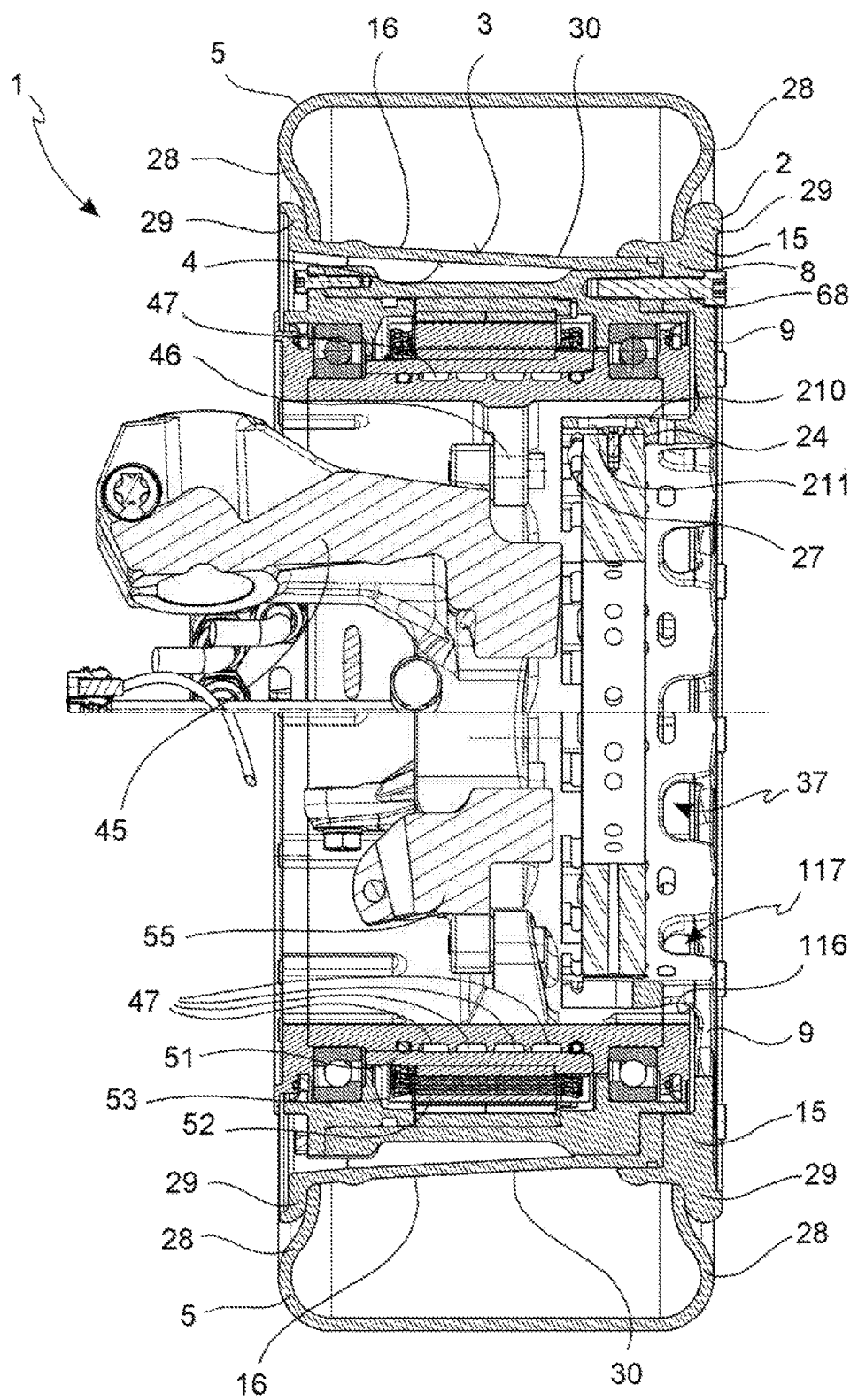
FIG. 4 is a cross section passing through the axis of rotation of the assembly of FIG. 1.
Figure 6:
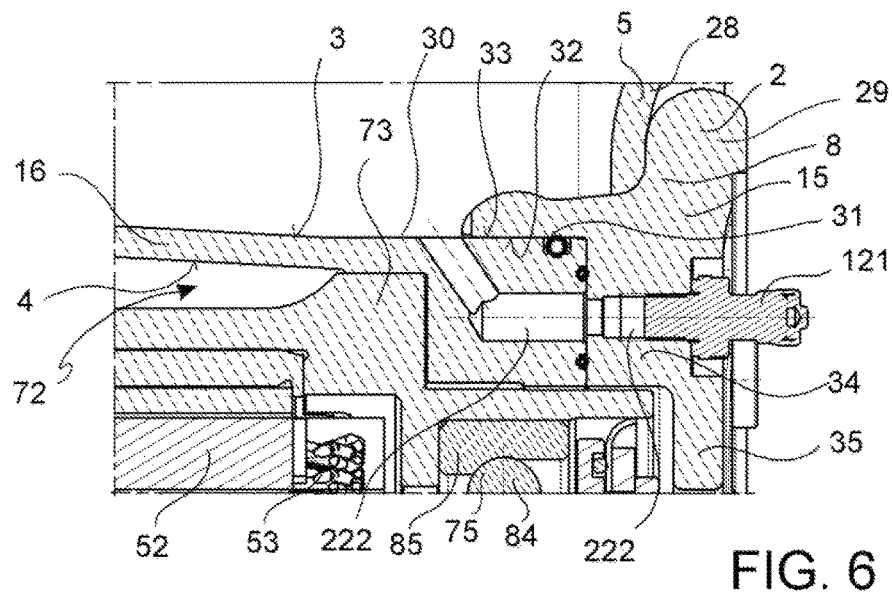
FIG. 6 is a detail of a cross section of the assembly of FIG. 1 along the line VI-VI.
Figure 7:
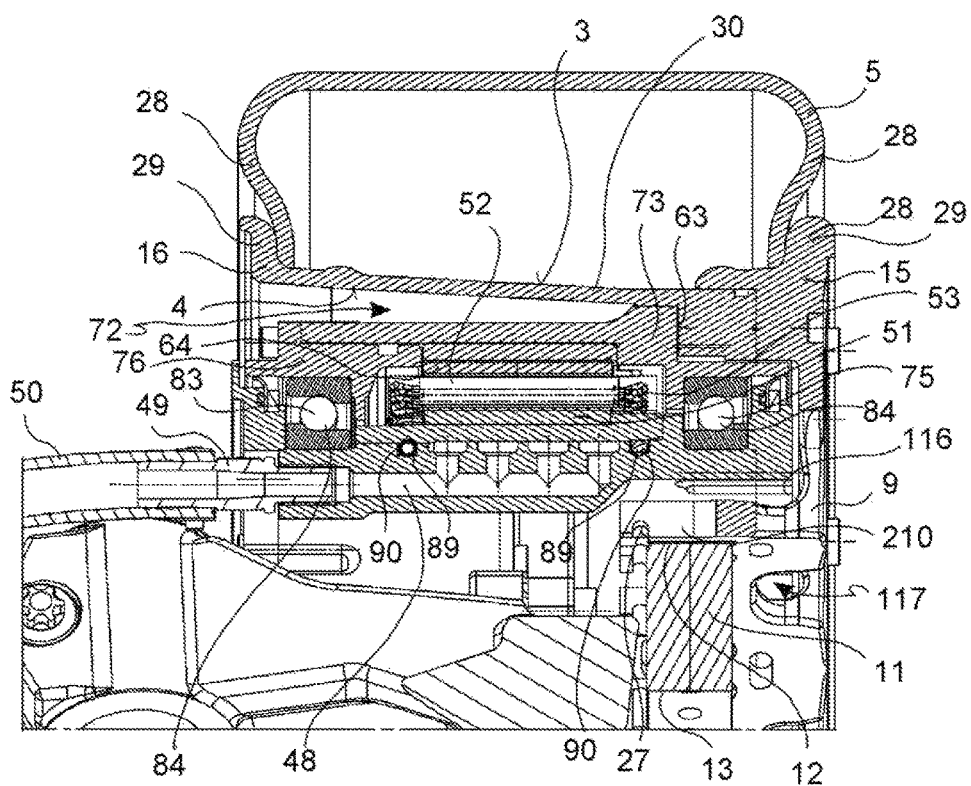
FIG. 7 is a detail of a cross section of the assembly of FIG. 1 along the line VII-VII.
Figure 8:
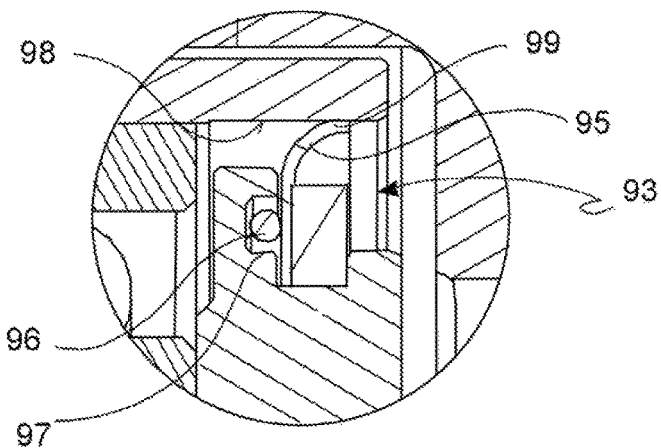
FIG. 8 is a detail in section of the device comprising a gasket protecting the bearings placed between stator and rotor.
Figure 11:
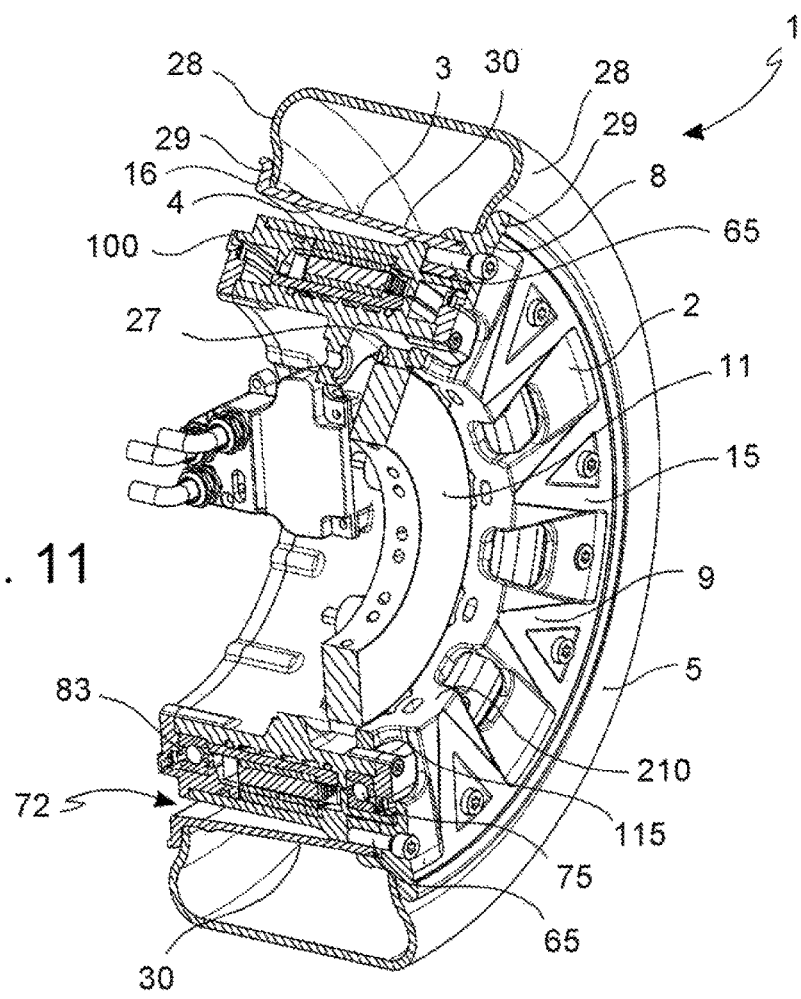
Figure 12:
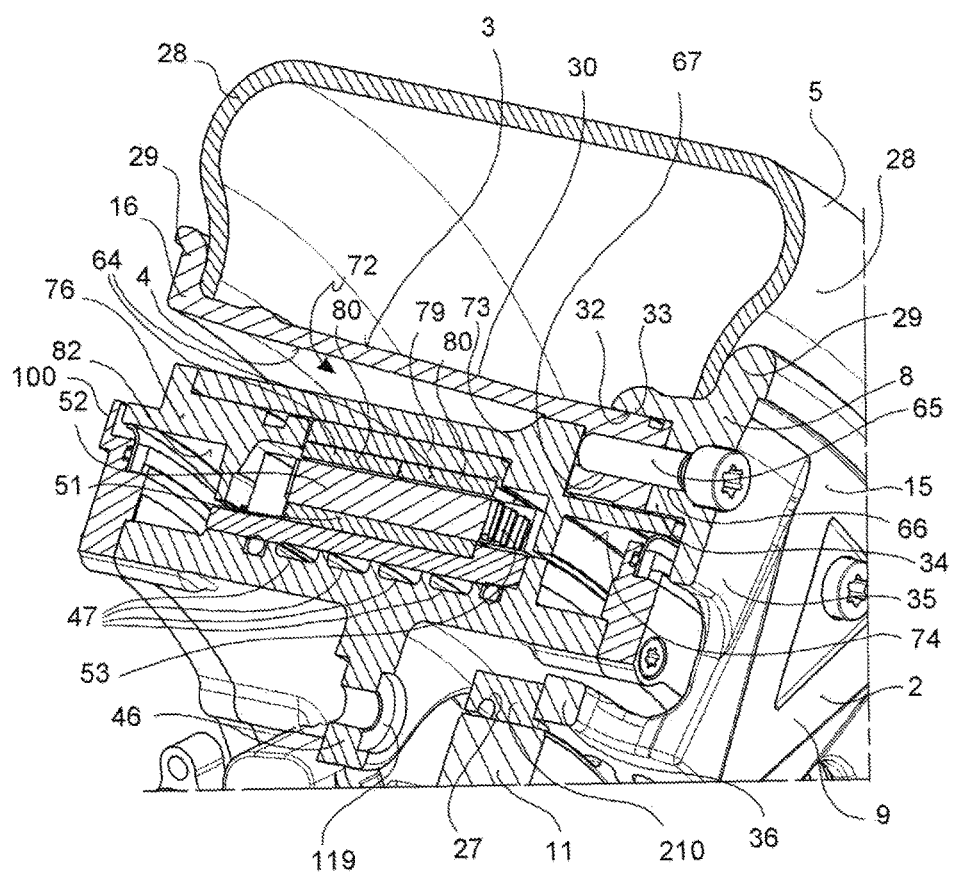
Figure 15:
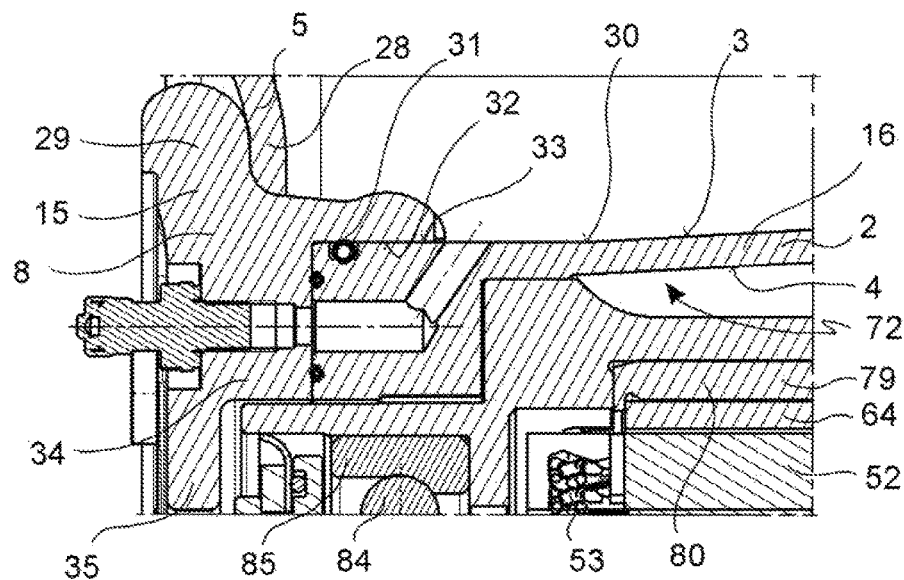
Figure 16:
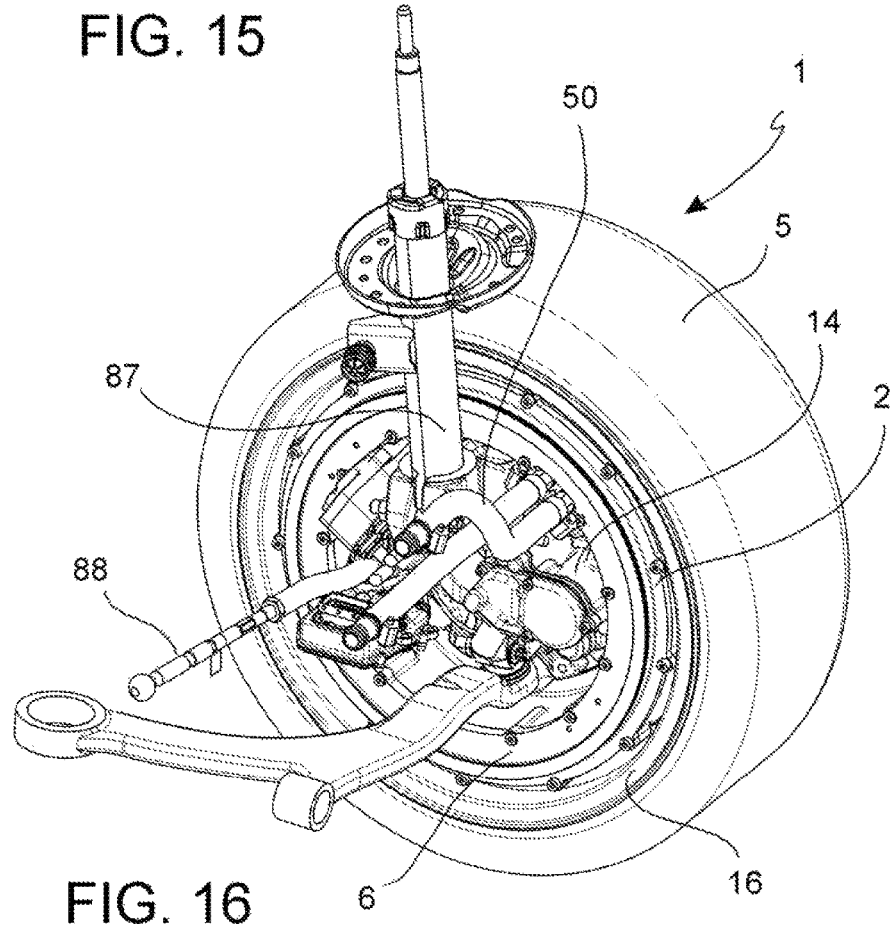
Figure 17:
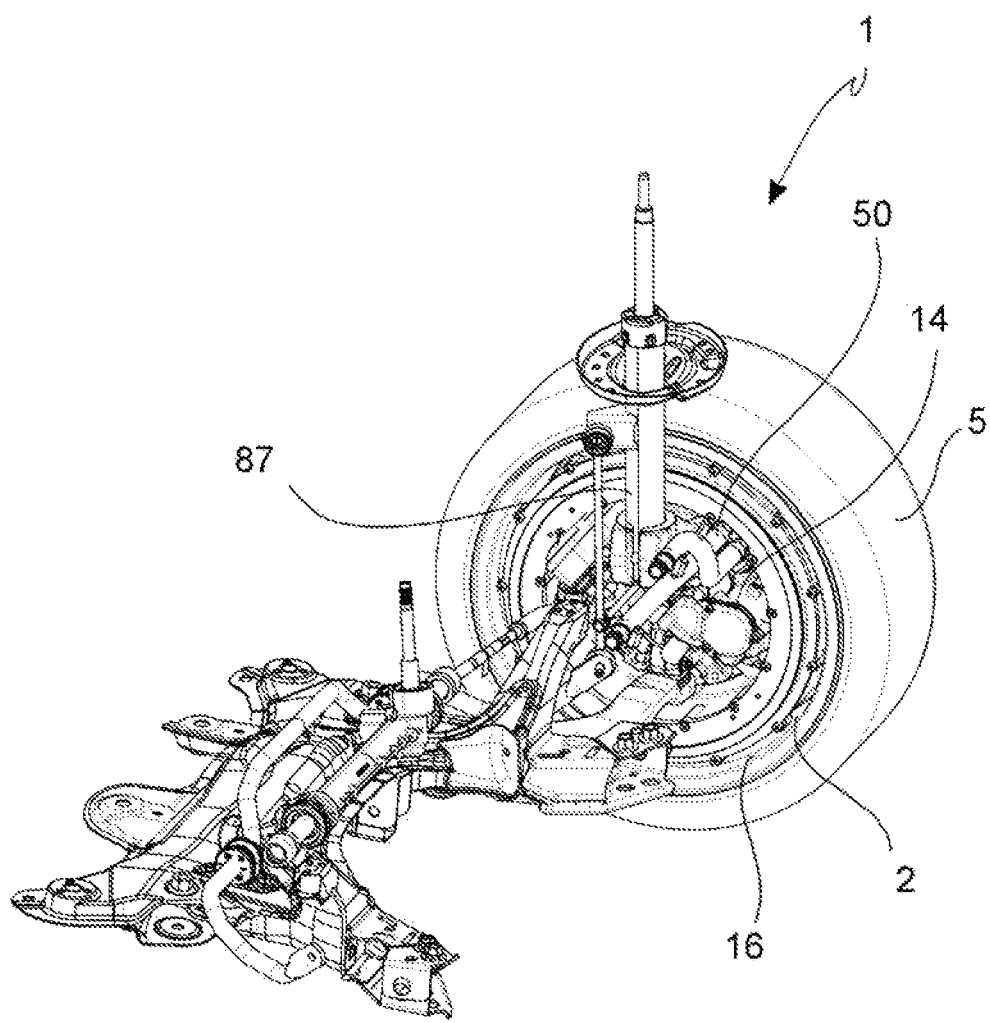
Figure 18:
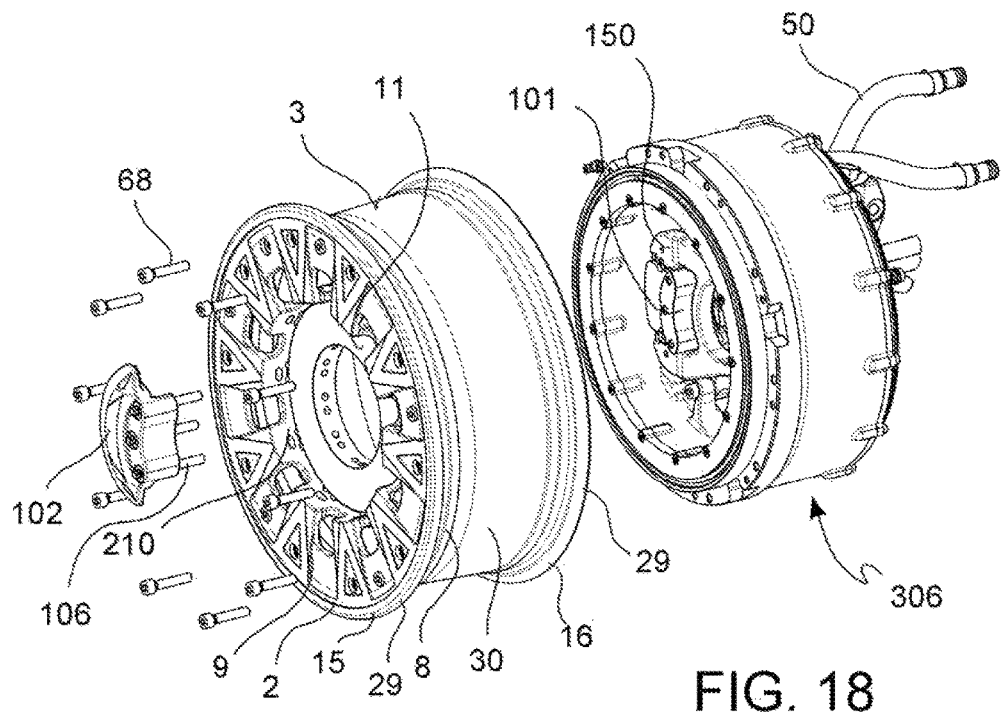
Figure 19:
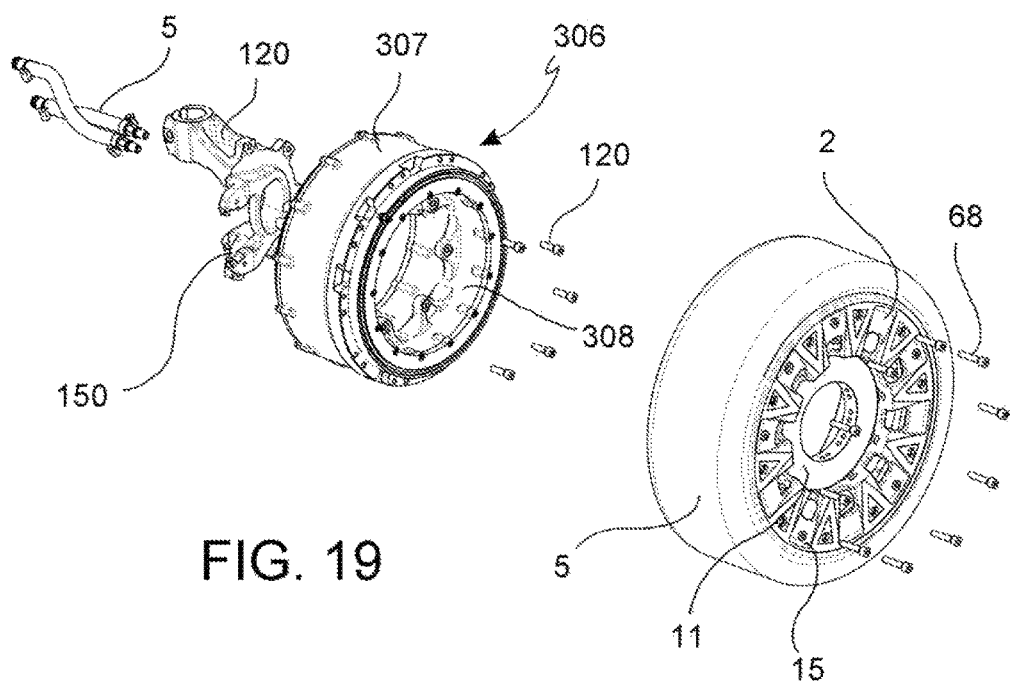
Figure 20:
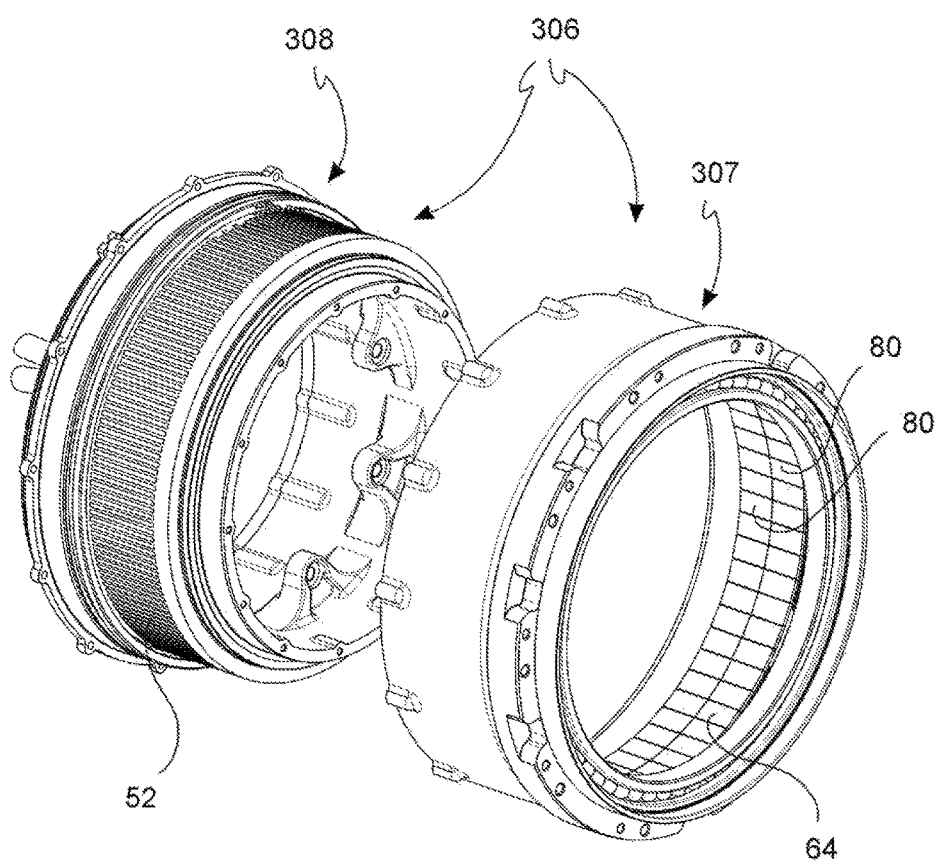
Figure 21:
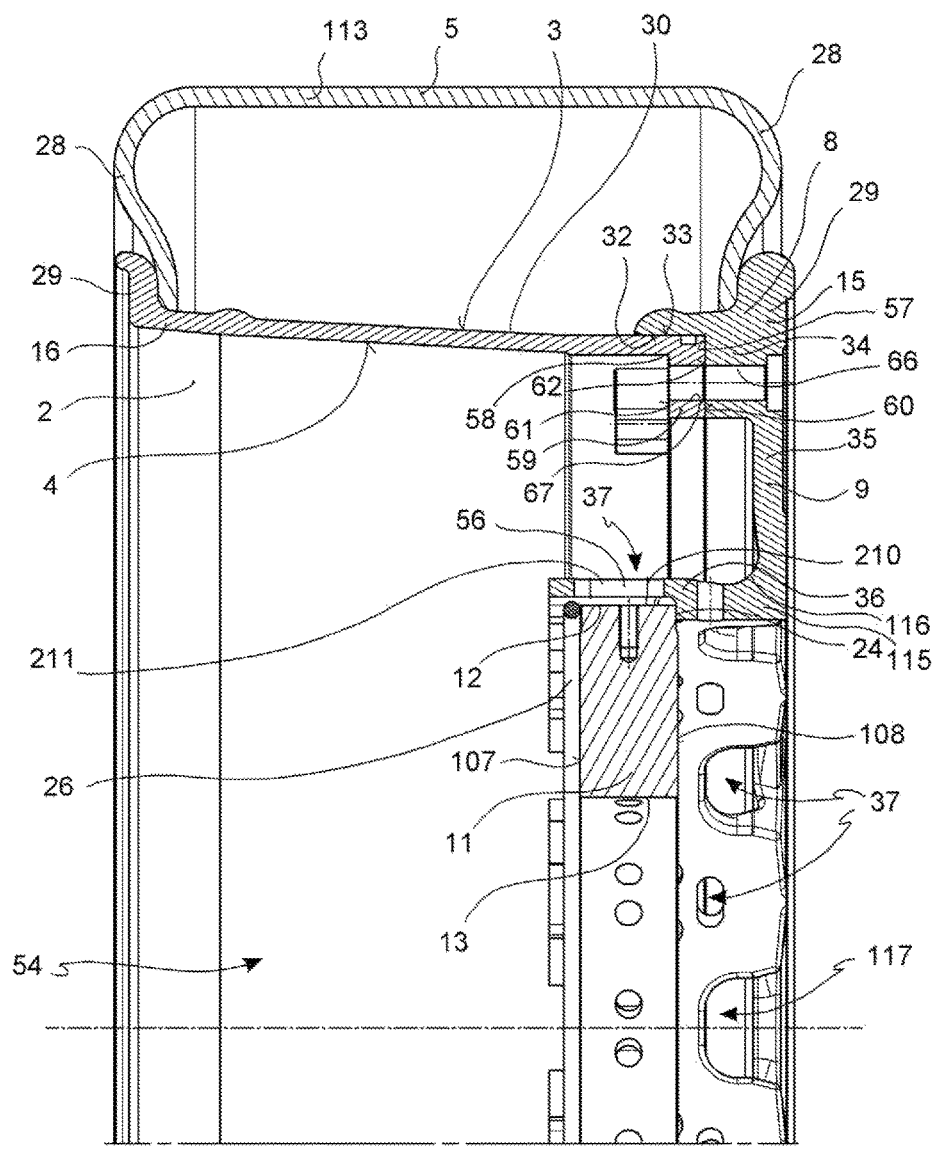
Figure 22:
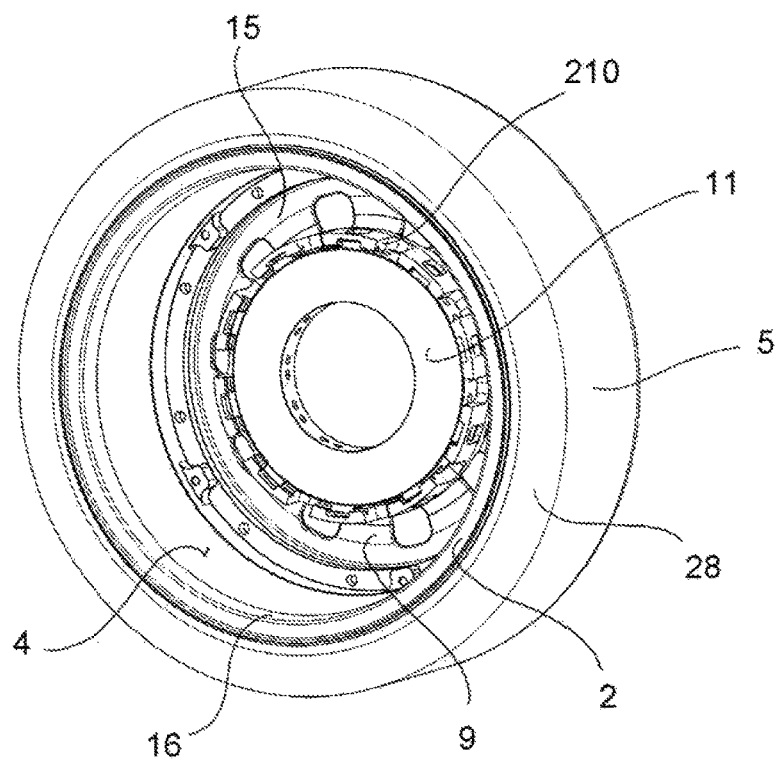
Figure 23:
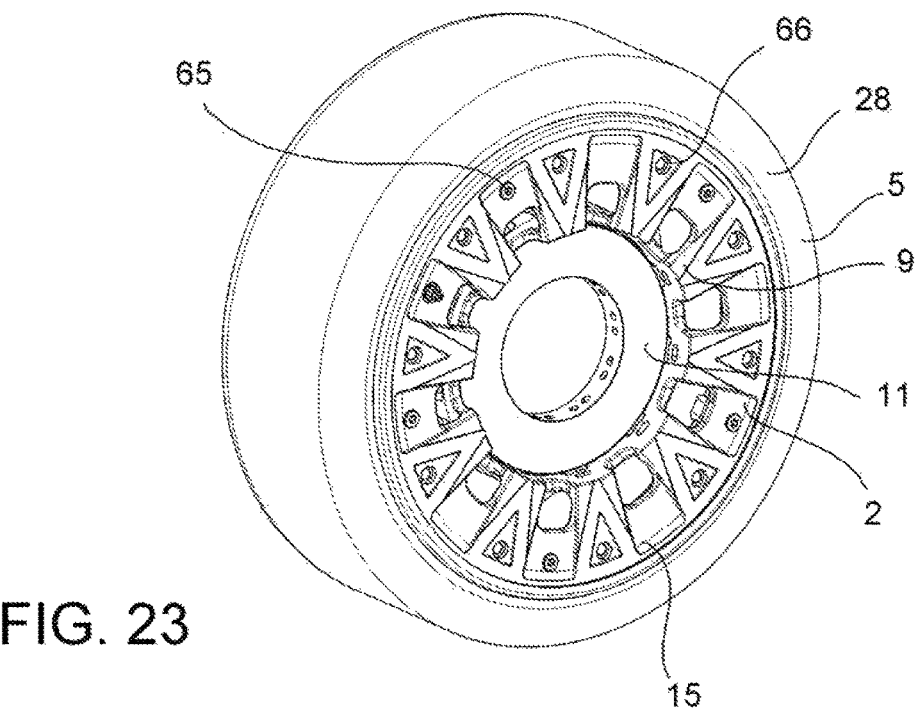
Figure 24:
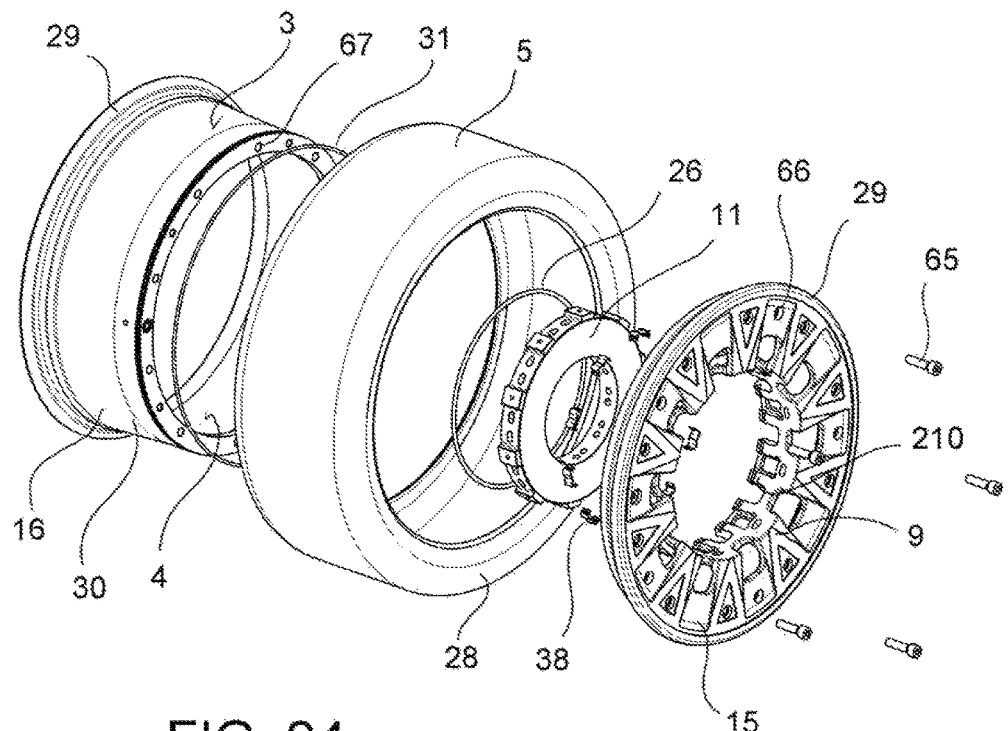
Figure 25:
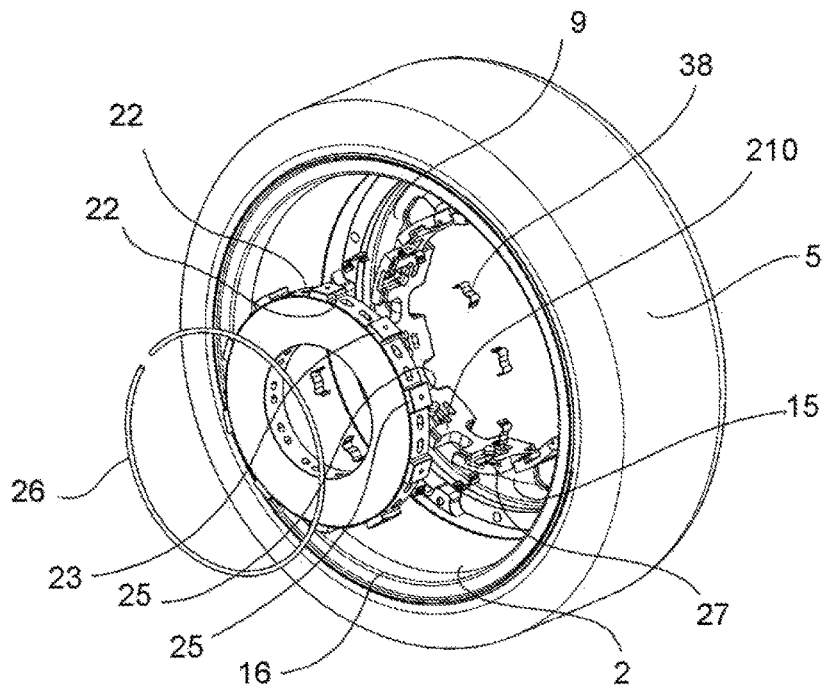
Figure 26:
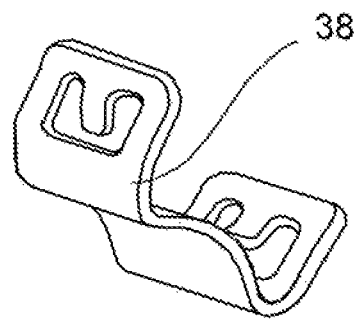
Figure 27:
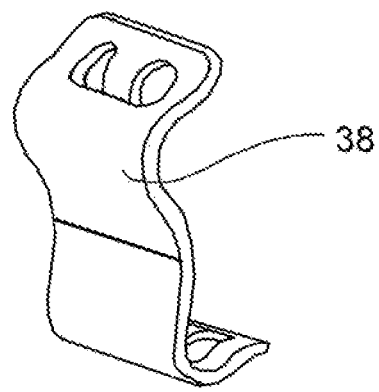

FIG. 11 represents, in a partially-sectioned axonometric view, an assembly according to FIG. 9 wherein the section planes are circumferentially arranged at an angle different from that shown in FIG. 9 to better represent the connecting devices of the two parts of the wheel rim;

FIG. 12 represents, in a partially-sectioned axonometric view, a detail of FIG. 11;

FIG. 13 is a detail of a cross section of the assembly of FIG. 9 along a different section angle coincident with the axis of the thrust means of the brake caliper of the service braking device;

FIG. 14 is a detail of a cross section of the assembly of FIG. 9 along a different section plane having a different section angle coincident with the axis of the parking brake device;

FIG. 15 is a detail of a section of the assembly of FIG. 9 in a different section angle and, in particular, in correspondence of the devices for inflating the tyre;

FIG. 16 represents, in an axonometric view, a detail of the assembly of FIG. 9 from the vehicle side, wherein the suspension and steering devices and the motor cooling system are highlighted;

FIG. 17 represents, in an axonometric view, a wheel rim, tyre and suspension assembly and a portion of the body;

FIG. 18 represents, in an exploded axonometric view, an assembly comprising a wheel rim, a braking device and an electric motor;

FIG. 19 represents, in an exploded axonometric view, an assembly comprising an electric motor and a bracket formed in a single piece with the hub carrier, and the pipes feeding coolant to the electric motor;

FIG. 20 represents the electric motor in an exploded axonometric view and shows the rotor separately from the stator;

FIG. 21 represents, in cross section, a detail of the wheel rim and the disc brake disc associated to it;

FIG. 22 represents, in an axonometric view from the inner side of the vehicle, the assembly of FIG. 21;

FIG. 23 represents, in an axonometric view from the outer side of the vehicle, the assembly of FIG. 21;

FIG. 24 represents, in an exploded axonometric view, the components of the assembly of FIG. 21;

FIG. 25 represents, in an axonometric view, the assembly of FIG. 21 wherein the brake disc and its axial stop are exploded;

FIGS. 26 and 27 show, in axonometric views, a spring suitable to be interposed between the disc brake disc and at least one spoke.

DESCRIPTION OF SEVERAL PREFERRED EMBODIMENTS

With reference to the above-mentioned figures and according to a general form of embodiment, a wheel assembly 1 for a vehicle, comprising a wheel rim 2 suitable to rotate about an axis of rotation a-a and defining an axial direction A-A parallel to, or coincident with, said axis of rotation a-a, an orthogonal radial direction R-R and a circumferential direction, as well as a tangential direction T-T orthogonal to the axial direction A-A and the radial direction R-R.

Said wheel rim 2 presents a radially outer side, or outer side 3, opposite to the axis of rotation a-a, and a radially inner side, or inner side 4, facing the axis of rotation a-a. Said wheel rim is suitable to externally receive a tyre 5 and, internally forms a cylindrical wheel rim chamber 54 radially delimited by said inner side 4.

In addition, said assembly comprises a motor 306, in its turn, comprising a rotor 307 and a stator 308. Said rotor 307 is supported, free to rotate, coaxially to said stator 308. The stator is fixed to a stator support 120.

Advantageously, said motor 306 is housed in the said cylindrical wheel rim chamber 54 of said wheel rim 2. In this way, the assembly has overall dimensions that coincide with the overall dimensions of the wheel (wheel rim and tyre) and is easily adaptable to vehicles of even small dimensions. Moreover, if this assembly is used for steering wheels, the assembly described here is perfectly suitable to not hinder the steering mechanisms, in addition to those of the suspension.

Advantageously, said rotor 307 is selectively, removably and rigidly connected to the inner side 4 of said wheel rim 2. In particular, the connection between the rotor 307 and the inner side of the wheel rim 2 avoids the interposition of elastic members or damping members between said rotor 307 and said wheel rim 2. In this way, the overall dimensions of the motor are reduced even more and ample space is left inside the wheel. The arrangement of the motor connected with its rotor to the wheel rim allows to have large air-gap radii or spaces between rotor and stator, so as to achieve high traction torque.

In accordance with an embodiment, the motor 306 extends primarily in the axial direction A-A being particularly compact in the radial direction R-R.

Advantageously, said assembly 1 also comprises a braking device 10. Said braking device comprises a disc brake disc 11 having a radially outer edge 12 and a radially inner edge 13. Said braking device 10 also comprises a disc brake caliper 14 selectively, removably and floatingly connected, directly or indirectly, to said stator support 120. Said disc brake caliper 14 is placed with its active part 21 astride the inner edge 13 of said disc brake disc 11.

With particular advantage, said wheel rim 2 is made in two parts 15, 16 selectively and removably connected with each other to form a wheel rim body 17.

In accordance with an embodiment, one of the two parts of said wheel rim 15 forms in a single piece at least one spoke 18 that protrudes radially towards the axis of rotation a-a.

In accordance with an embodiment, said disc 11 is connected with its outer edge 12 to said at least one spoke 18.

In accordance with an embodiment, a portion of said at least one spoke 18 forms at least one axial guide 210 defining at least one guide surface 211 having at least one portion that extends along the axial direction A-A.

In accordance with an embodiment, said at least one axial guide 210 defines at least one guide surface 211 having at least one portion that extends along the radial direction R-R.

In accordance with an embodiment, said disc 11 is connected removably with its outer edge 12 to said at least one spoke 18.

In accordance with an embodiment, said disc 11 is connected slidingly with its outer edge 12 to said at least one spoke 18.

In accordance with an embodiment, said disc 11, comprises, in correspondence to said its outer edge 12, at least one guide counter-surface 22 that cooperates with said guide surface 211 to allow said disc 11 to slide in the axial direction A-A. In accordance with an embodiment, said guide counter-surface 22, cooperating with said guide 210, creates a support that extends in the axial direction A-A for the free sliding of the disc brake disc 11.

In accordance with an embodiment, said disc 11, comprises, on said its outer edge 12, at least one guide counter-surface 22 that cooperates, with at least one of its portions, with a portion that extends along the radial direction R-R.

In accordance with a different embodiment, said disc 11, comprises, on said its outer edge 12, at least one guide counter-surface 22 that cooperates, with at least one of its portions, with a portion that extends along the tangential or circumferential direction T-T of at least one guide surface 211 of the at least one axial guide 210 of said at least one spoke 18.

In accordance with an embodiment, said guide counter-surface 22, cooperates with said guide 210 and creates a support in tangential or circumferential direction T-T that, for example, extends in a radial R-R and/or axial A-A direction and is suitable to transmit the braking action between disc 11 and wheel rim.

In accordance with an embodiment, a portion of said at least one spoke 18 forms at least one axial guide 210 defining at least one guide surface 211 directed along the axial direction A-A.

In accordance with an embodiment, said disc 11 is geometrically coupled with its outer edge 12 with said axial guide 210 to make said disc slidable or floatable in axial direction A-A and, at the same time, to abut said outer edge of the disc against abutment surfaces 211 provided in said guides 210 for the tangential T-T support of the disc during the braking action.

In accordance with an embodiment, said disc 11 comprises in said its outer edge 12, at least one geometrical-coupling radial extension 23 with at least one seat forming guide surfaces 211 provided in said at least one spoke 18.

In accordance with an embodiment, said disc 11 comprises at least one radial extension 23 that protrudes radially away from said its axis of rotation a-a, said at least one radial extension 23 forms a guide counter-surface 22 that extends in axial direction A-A and in radial direction R-R, or a direction parallel to radial direction R-R, forming a counter-surface of abutment or tangential stop. Said at least one spoke 18 comprises at least one groove 56 that forms at least one guide surface 211 that extends in axial direction A-A and in radial direction R-R, or a direction parallel to radial direction R-R, forming a surface of abutment or tangential stop. Said at least one extension 23 is received in said at least one groove 56 so as to bring said guide counter-surface 22 to said guide surface 211, so that during a braking action, said guide counter-surface 22 abuts or stops against said guide surface 211.

In accordance with an embodiment, said at least one spoke 18 are a plurality of spokes 18, preferably, but not necessarily, distributed circumferentially.

In accordance with an embodiment, said at least one guide surface are a plurality of guide surfaces 211 and said at least one guide counter-surface are a plurality of guide counter-surfaces 22, preferably, but not necessarily, circumferentially distributed.

In accordance with an embodiment, said at least one guide surface are a plurality of opposing guide surfaces 211 and said at least one guide counter-surface are a plurality of opposing guide counter-surfaces 22, preferably, but not necessarily, circumferentially distributed.

In accordance with an embodiment, a portion of said at least one spoke 18 forms at least one axial guide 210 geometrically coupled with the outer edge 12 of said disc 11 for the sliding movement, or floating movement, along an axial direction of said disc 11. Said axial guide comprises at least one axial end-of-stroke stop 24.

In accordance with an embodiment, said axial end-of-stroke stop 24 forms an annular surface 25 radially extending to form an axial stop for annular portions of the side walls 25 of the outer edge of the disc. In accordance with an embodiment, said at least one axial end-of-stroke stop is obtained with a retaining ring, or Seeger® ring 26, partially received in an annular radial groove 27 formed in said at least one axial guide 210.

In accordance with an embodiment, between said disc 11 and said spoke 18, a spring, for example, a Shim® spring 38, is interposed in order, for example, to limit the wear of the sliding of the disc against the at least one spoke.

In accordance with an embodiment, said spring 38 is interposed between the disc 11 and at least one spoke 9, for example, to reduce, as well as eliminate, a possible knocking or collision between the disc and at least one spoke, for example, in the case of the vehicle travelling in reverse.

In accordance with an embodiment, the geometry of the spring 38 allows to keep the dragging of the disc "centred" relative to the guide of the at least one spoke 9.

In accordance with an embodiment, the geometry of the spring 38 allows producing a tangential thrust on the disc in the forward direction of the vehicle, so as to ensure contact between the disc and at least one spoke and avoid shocks in the initial instants of braking even in the case of worn components.

In accordance with an embodiment, said spring 38 is interposed between the disc 11 and at least one spoke 9, for example, to avoid the disc deforming the at least one spoke, creating an imprint or step due to the locally high specific pressures.

In accordance with an embodiment, said spring 38 allows pre-loading the disc in abutment in tangential direction T-T, so as to avoid shocks at the beginning of the braking action. In accordance with an embodiment, the elasticity of the spring 38 allows cushioning the momentary contact between the disc and at least one guide and/or facilitating the sliding in the axial direction of the disc on said axial guide 210.

In accordance with an embodiment, said at least one spoke 18 are a plurality of spokes circumferentially distributed, for example but not necessarily, in such a number as to allow guiding, without jamming, the floating movement of the disc brake disc 11 and/or limiting, within pre-defined values, the stress per unit of area transmitted from the brake disc to the wheel rim during the braking action.

In accordance with an embodiment, said two parts 15, 16, or outer half-rim 15 and inner half-rim 16, are selectively and removably connected to each other to form a rim body 17, each forming a single annular holding edge 29 extended substantially circumferentially T-T.

In accordance with an embodiment, said tyre has circumferential shoulders for coupling to the rim and said two parts 15, 16, or outer half-rim 15 and inner half-rim 16, selectively and removably connected to each other to form a rim body 17, each forming a single holding edge 29 to hold the shoulders 28 of said tyre.

In accordance with an embodiment, each of said two parts 15, 16 forms an opposite annular holding edge 29. Said opposite edges 29 cooperate with each other when the two parts are connected to form the rim body 17, forming, in the radially outer direction, a channel 30 for holding the tyre 5.

In accordance with an embodiment, a gasket 31 is interposed between said two parts 15, 16, selectively and removably connected to form a rim body 17, to allow, for example, the use of tires without tube, or tubeless, and prevent the escape of pressurized gases from the chamber formed between the channel of the rim and the inside of the tyre. In accordance with an embodiment, said gasket is an O-ring 31 arranged between two circumferentially and axially extended surfaces 32, 33 of said two parts 15, 16 of the rim overlapping one another in the radial direction R-R so as to create a seal between these two parts but avoid the gasket 31 being excessively stressed by tightening in the axial direction between the two parts of the rim 2.

In accordance with an embodiment, said first part, or the first half-rim or outer half-rim 15, forms in a single piece at least one spoke 18 and is the part placed outside of a vehicle that mounts said wheel assembly 1.

In accordance with an embodiment, said first part 15 has, in at least one of its sections, a section made along a radial-axial plane, with substantially a "C" shape, with its concavity facing towards the inside of the assembly 1, forming with a first length 34 of the "C"-shaped section, a holding portion for the tyre 5, with a second central length 35 of the "C"-shaped section, the at least one spoke 18, and with a third length 36 of the "C"-shaped section, at least one axial guide 210 for supporting said disc of the disc brake in rotation with said wheel rim 2.

In accordance with an embodiment, said third length comprises, in one of its portions external to said support portion of the disc 210, at least one cooling opening 37 suitable to allow the radial outflow of cooling air circulating in the vicinity of the disc brake disc 11.

In accordance with an embodiment, said first part, or first half-rim 15, comprises a first seat 57 for partially coupling and receiving the motor 306.

In accordance with an embodiment, said second part, or second half-rim 16, comprises a second seat 58 for partially coupling and receiving the motor 306.

In accordance with an embodiment, said second part, or second half-rim 16, comprises an annular radial extension 59 that forms a stop surface 60 and an opposite stop surface 61.

In accordance with an embodiment, said first part, or first half-rim 15, comprises a stop counter-surface 62.

In accordance with an embodiment, said stop counter-surface 62 of said first part, or first half-rim 15, is suitable to abut against said stop counter-surface 60 of said second part or second half-rim 16.

In accordance with an embodiment, said rotor 307 of said motor 306 comprises rotor counter-surface 63 suitable to abut against said opposite stop counter-surface 61 of said annular radial extension 59.

In accordance with an embodiment, said first part, or first half-rim 15, is connected to said second part, or second half-rim 16, by at least a first stud 65 received in a through hole 66 provided in the first part, or first half-rim 15, and screwed into an aligned threaded hole 67 provided in the second part, or second half-rim 16.

In accordance with an embodiment, said at least one first stud are a plurality of studs 65 received in respective threaded through holes 66 and 67, for example, distributed circumferentially in said first and second parts 15, 16.

In accordance with an embodiment, at feast one second stud 68 connects said wheel rim 2 to said motor 306.

In accordance with an embodiment, said at least a second stud 68 is received in a through hole 66 provided in the first part, or first half-rim 15, and an aligned second through hole 69 provided in the second part, or second half-rim 16, said second stud 68 being screwed in an aligned second threaded hole 70 provided rotor 307 of motor 306.

In accordance with an embodiment, said at least one second stud 68 are a plurality of second studs 68 received in respective aligned through holes 66, second through holes 69 and second threaded holes 70.

In accordance with an embodiment, said first studs 65 are circumferentially intercalated by one or more second studs 68.

In accordance with an embodiment, said at least one second stud 68 is radially aligned with said at least one spoke 18, so that the connection of the rotor of the motor to the wheel rim occurs at a point of the rim of greater thickness or strength.

In accordance with an embodiment, said motor 306 is connected to said rim 2 in the vicinity of one of its sides 71, remaining cantilevered towards the inside of the rim, leaving a gap, or air chamber 72, between motor 306 and inner side 4 of the wheel rim 2. In accordance with an embodiment, said gap, or air chamber 72, is open, for example, towards the vehicle so as to be protected even if opened, allowing the heat produced by the motor during the its operation to escape from the wheel assembly 1 and avoiding that the heat dangerously raises the temperature of the rim, the tyre and especially the motor and braking device.

In accordance with an embodiment, the motor 306 is connected only via one of its sides 71 to the rim 2, forming a chamber 72 between the rotor of the motor 307 and the inner side 4 of the wheel rim. In accordance with an embodiment, said gap, or air chamber, allows avoiding the direct transmission of stresses from rim body 17 to the rotor 307.

In accordance with an embodiment, said motor 306 comprises a rotor-holding structure 39 that receives an active part 64 of the rotor 307 suitable to firmly but removably connecting to the wheel rim 2, for example, by means of one of its sides 71, in such a way as to extend inside the rim 2 remaining firmly fixed and substantially cantilevered.

In accordance with an embodiment, said rotor-holding structure 39 comprises a first part of the rotor-holding structure 73, for example, placed towards the outer side of the vehicle. In accordance with an embodiment, said first part of the rotor-holding structure 73 comprises means for connection to the rim 2, for example, a threaded second hole of rotor 70 suitable to receive a second stud connecting the rim to motor 306.

In accordance with an embodiment, said first part of the rotor-holding structure 73 comprises a first outer seat of the bearing 74 suitable to receive an outer bearing 75 between rotor and stator. For example, the said outer seat of the bearing 74 is an annular seat having a cross section substantially of an inverted "L" shape, so as to allow the fitting of said outer bearing 75.

In accordance with an embodiment, said rotor-holding structure 73 comprises means of connection to a second part rotor-holding structure 76, for example, placed on the inner side towards the vehicle. In accordance with an embodiment, said connection means are a third threaded hole 77 suitable to receive a third stud 78 connecting the first and second part of the rotor-holding structure 73, 76.

In accordance with an embodiment, said first part of the rotor-holding structure 73 is connected to said second part of the rotor-holding structure 76, pack clamping between them said active part 64 of the rotor 307, for example an outer support ring for permanent magnets 79 suitable for supporting permanent magnets 80 so that the permanent magnets 80 may be mounted circumferentially in the rotor, but are not subjected to mechanical stress during the pack closure of the two parts of the holding structure and so that the magnets maintain the correct radial arrangement relative to the stator. In accordance with an embodiment, said outer ring for supporting permanent magnets 79 is made of a material suitable to "guide" the magnetic flux of the magnets.

In accordance with an embodiment, said second part of rotor-holding structure 76 comprises a third through hole 81 suitable to receive the third stud 78 connecting the first and second part of the rotor-holding structure.

In accordance with an embodiment, said second part of the rotor-holding structure 76 comprises a second outer seat of bearing 82 suitable to receive an inner bearing 83 between the rotor and stator, for example, said second outer seat of bearing 82 is a seat having a cross section substantially with an "L" shape so as to allow the fitting of said inner bearing 83.

In accordance with an embodiment, said outer bearing 75 and said inner bearing 83 between the rotor and stator are placed, for example, with their rolling means 84, substantially radially aligned or, in other words, substantially at the same distance from the axis of rotation a-a, for example but not necessarily, substantially radially aligned with each other, for example, at a pre-defined radial distance from the air gap between rotor and stator.

In accordance with an embodiment, said outer bearing 75 and said inner bearing 83 between the rotor and stator comprise rolling thrust blocks of the rolling means 85 made of steel or, preferably, aluminium or other light alloy, for example but not necessarily, surface hardened so as to reduce the wear of the rolling tracks 86 of rolling means 84 formed in the thrust blocks 85 and, at the same time, to be particularly light being arranged as non-suspended mass of the vehicle and, thus, subjected to accelerations at high frequency due to shocks to the assembly during the rolling of the tyre on the road.

In accordance with an embodiment, said outer bearing 75, in particular its outer thrust block, is arranged axially between said first part of rotor-holding structure 73 and said first part of the wheel rim that extends to form at least one spoke 9.

In accordance with an embodiment, said inner bearing 83, in particular its outer thrust block, is arranged between said second part of rotor-holding structure 76 and a holding ring, for example, a small annular prominence that can be passed over during the phase of keying.

In accordance with an embodiment, said inner bearing 83, in particular its outer thrust block, is arranged between said second part of rotor-holding structure 76 and a holding ring, for example, a Seeger® ring holding inner bearing 86.

In accordance with an embodiment, said motor 306 comprises a stator-holding structure 40 comprising said stator support 120 and a support ring for stator plates 51.

In accordance with an embodiment, said stator support 120 comprises a cylindrical body 41 having an inner surface 42 and an outer surface 43, said cylindrical body 41 form a hollow central area 44 suitable to receive a portion of a suspension 45 and its connection to said cylindrical stator support body 41. In accordance with an embodiment, connected to said inner surface of stator body 42, there are securing loops for connecting to the suspension, for example, a hub bracket 55 and/or steering arms 88.

In accordance with an embodiment, said hollow central area 44 is suitable to receive said disc brake disc 11 connected to said at least one spoke of wheel rim 18.

In accordance with an embodiment, said stator support 120 comprises cooling channels 45 forming a circulation path for coolant. In accordance with an embodiment, said cooling channels 45 are formed in said outer surface of the cylindrical stator support body 41. In accordance with an embodiment, said channels extend circumferentially between them, remaining parallel to form independent cooling paths. In accordance with an embodiment, said cooling channels 45 merge into a manifold 48 to which is connected an insert 49 for connection to a cooling circuit of the vehicle 50.

In accordance with an embodiment, said cooling channels 45 are closed by a ring 51. In accordance with an embodiment, said ring 51 is made of aluminium and surface treated to avoid its oxidation in contact with coolant. In accordance with an embodiment, said ring 51 is mounted by interference on the stator support body and, on this, the stator plate pack is mounted with interference. In accordance with an embodiment, said ring 51 is placed in sealing contact with said stator plate support ring 52 around which the stator coils 53 are arranged so as to lap, with the coolant that runs through said channels 47, the active part of said stator 308.

In accordance with an embodiment, between said plate support ring 51 and said stator support 120, there are sealing means, such as O-rings 89 placed in grooves 90 provided externally in the stator support body and on both sides of the cooling channels 45, to prevent the loss of the coolant from said channels.

In accordance with an embodiment, said cylindrical body 41 of said stator support 120 comprises opposite sides of the stator support 91, 92 and wherein there are provided sealing means 93 placed between the stator 308 and rotor 307, protecting bearings 75, 83. In accordance with an embodiment, said sealing means 93 are connected to said opposite sides of the stator 91, 92.

In accordance with an embodiment, said sealing means between the stator and the rotor 93 comprise a ring-shaped body of the sealing means 94 to which is associated a sealing lip 95, wherein said sealing lip 95 is closed in a pack between said ring-shaped body 94 and the side 91, or 92 of stator support 120.

In accordance with an embodiment, said stator support side 91, or 92, comprises a circumferential side groove 97 wherein is partially received a lip-compressing O-ring 96 that pack clamps said sealing lip 95 against said ring-shaped body of sealing means 94, wherein said lip is arranged so as to rest sealingly resting with its free end portion 99 laterally on a sliding surface of the rotor 98, preventing the entry of substances harmful to the functioning of the bearing in the bearing 75, or 83, as well as avoiding the leakage of bearing lubricant from the bearing.

In accordance with an embodiment, said sealing means 93 are fixed by screws to the sides of the stator support 91, 92.

In accordance with an embodiment, the sealing means 93 on the side that faces the outside of the vehicle are interposed between the stator support body 41 and the outer rim or first part of the wheel rim 15.

In accordance with an embodiment, the sealing means 93, placed on the side that faces the outside of the vehicle, comprise a ring that protects the lip 100 that, from the ring-shaped body of the sealing means 94, protrudes and partially one of its free ends faces without contact an inner side of the rotor.

In accordance with an embodiment, said ring-shaped body of the sealing means 94 pack clamps the inner thrust block of the bearings 75, 83 against the stator support body 41 and/or plate support ring 51.

In accordance with an embodiment, said disc brake disc 11 is bound tangentially T-T to said outer rim or the first part of the wheel rim 15.

In accordance with an embodiment, said disc brake disc 11 remains free to move in the axial direction A-A.

In accordance with an embodiment, said disc 11 is constrained in the axial direction A-A by the disc brake caliper 14 placed astride its inner edge 13.

In accordance with an embodiment, said disc brake caliper 14 is of the floating type and, in accordance with an embodiment, comprises a bracket 150 on which, thanks to guides, a floating clamp body can slide having, for example, an inner side caliper body 101, and an outer side caliper body 102.

In accordance with an embodiment, said inner side caliper body 101 receives thrust means 103 suitable to abut the inner pads against the inner braking surface of the disc, pulling back relative to bracket 150 to abut external pads 110 housed in said outer caliper body 102 against the opposite braking surface 108 of the disc 11.

In accordance with an embodiment, even the disc brake disc 11 is suitable to slide axially with respect to the spokes of the wheel rim and abut against the external pads housed in said outer caliper body.

In accordance with an embodiment, said bracket 150 is formed in a single piece with, or is solidly fixed to, said hub bracket 55.

In accordance with an embodiment, said inner side caliper body 101 houses thrust means 103 arranged facing an inner disc braking surface 107 facing towards the vehicle. In accordance with an embodiment, said thrust means 103 act on an inner pad 109 supported to said inner side caliper body 101, or preferably supported to said bracket 150, to abut against the inner disc braking surface 107.

In accordance with an embodiment, said outer side caliper body 102 is removably connected, for example, by means of studs with calibrated stems 106, to said inner side caliper body 101, said outer side caliper body 102 being arranged externally facing an outer braking surface of the disc 108, facing towards the opposite part of the vehicle. In accordance with an embodiment, said inner side caliper body 102 supports an external pad 110 suitable to abut against the outer braking surface of the disc 108.

In accordance with an embodiment, said outer side caliper body 102 is removably connected to said inner side caliper body 101 so as to be able to be separated from the inner side caliper body 101 avoiding disassembling the rim and/or avoiding removing the motor from the wheel rim.

In accordance with an embodiment, said thrust means 103 are thrust means for the generation of a service braking action, for example, a cylinder-piston unit 111 actuated by a braking circuit.

In accordance with an embodiment, for example, joined to said service thrust means 111 or integrated in the same thrust unit, there is a parking thrust unit or parking function, for example, acting on the same caliper body 102, for example, comprising an electro-mechanical actuator unit 112.

Below, we describe a method of use of the assembly described here, for example, a maintenance method of the assembly.

In accordance with one form of use, a maintenance method of an assembly 1, an assembly as described above or as will be described below in accordance with further embodiments, comprises the following steps in succession:
    remove the outer side caliper body 102;
    remove the rim 2 from the rotor 307.

In accordance with a possible use, at least one of the following further steps are comprised:
    remove the disc brake disc 11;
    and/or
    replace the disc brake disc 11;
    and/or
    replace one or both pads 109, 110.

In accordance with one form of use, a maintenance method of an assembly 1 comprises the following steps:
    remove the outer side caliper body 102;
    unscrew and remove the second studs 68 that connect the rim 2 to the rotor 307, avoiding unscrewing the first studs 65 that connect the first and second half-rims or outer and inner part of the rim 6, 7;
    remove the rim 2 from the motor 306.

In accordance with a possible use, at least one of the following further steps are comprised:
    replace the rim 2;
    and/or
    replace the tyre 113 fitted on the rim 2;
    and/or
    remove the disc brake disc 11;
    and/or
    replace the disc brake disc 11;
    and/or
    replace one or both pads 109, 110.

In accordance with one form of use, a maintenance method of an assembly 1 comprises the following steps:
    remove the outer side caliper body 102;
    unscrew and remove the second studs 68 that connect the rim 2 to the rotor 307, avoiding unscrewing the first studs 65 that connect the first and second half-rims or first and second part of the rim 15, 16;
    remove the rim 2 from the rotor 307;

disconnect the power to the motor and/or the cooling circuit of the stator;

disconnect the motor 306 from the hub bracket 55 by loosening the caliper screws 118 that connect the hub bracket with loops 119 of the inner support of the stator 9.

In accordance with a possible use, at least one of the following further steps are comprised:

separate the motor 306 from the vehicle;

and/or replace the motor 306.

Obviously, a person skilled in the art, in order to satisfy contingent and specific needs, may make numerous modifications and variations to the assembly according to the invention, all however contained within the scope of the invention as defined by the following claims.

For example, in accordance with an embodiment, said disc brake caliper 14 is of the fixed type and said disc brake disc 11 is of the floating type.

In accordance with an embodiment, said disc brake disc 11 is slidable along said at least one spoke 9.

In accordance with an embodiment, said disc brake disc 11 is extractable from the outer side of the wheel rim 2, even without removing said rim from the vehicle.

In accordance with a further general embodiment, an assembly 1 comprises a wheel rim 2 suitable to rotate around an axis of rotation a-a, defining an axial direction A-A, an orthogonal radial direction R-R, and a circumferential direction T-T orthogonal to the axial direction A-A and the radial direction R-R, said wheel rim 2 has an outer side 3, opposite to the axis of rotation a-a, and an inner side 4 facing the axis of rotation a-a. In accordance with an embodiment, said rim is suitable to externally receive a tyre 5. Said wheel rim forms internally a cylindrical chamber 54 of the wheel rim radially delimited by said inner side 4.

In accordance with an embodiment, said assembly 1 also comprises a braking device 10. Said device comprises a disc brake disc 11 having a radially outer edge 12 and a radially inner edge 13, and a disc brake caliper 14 selectively and removably connected directly or indirectly to said stator support 120, or a hub bracket 55, and being placed with its active part 21 astride the inner edge 13 of said disc brake disc 11.

In accordance with an embodiment, said wheel rim 2 is made in two parts 15, 16 selectively and removably connected with each other to form a wheel rim body 17.

In accordance with an embodiment, one of the two parts of said wheel rim 15 forms in a single piece at least one spoke 18 that protrudes radially towards the axis of rotation a-a.

In accordance with an embodiment, said disc 11 is connected removably with its outer edge 12 to said at least one spoke 18.

In accordance with an embodiment, said disc 11 is connected removably with its outer edge 12 to said at least one spoke 18 free to slide or float during its operation in axial direction A-A.

In accordance with a further general embodiment, an assembly 1 comprises a wheel rim 2 suitable to rotate around an axis of rotation a-a, defining an axial direction A-A, an orthogonal radial direction R-R, and a circumferential direction T-T orthogonal to the axial direction A-A and the radial direction R-R. Said wheel rim 2 presents an outer side 3, opposite to the axis of rotation a-a, and an inner side 4, facing the axis of rotation a-a.

Said wheel rim is suitable to externally receive a tyre 5 and wherein said wheel rim internally forms a cylindrical wheel rim chamber 54 radially delimited by said inner side 4.

In addition, said assembly comprises a motor 306 with a rotor 307 and a stator 308. Said rotor 307 is supported, free to rotate, on said stator 308. Said motor 306 is housed in the said cylindrical wheel rim chamber 54 of said wheel rim 2.

Advantageously, said motor 306 comprises a rotor-holding structure 39 that receives an active part 64 of the rotor 307 suitable to firmly but removably connecting to the wheel rim 2, in such a way as to extend inside the rim 2 remaining firmly fixed and substantially cantilevered. Said rotor-holding structure 39 comprises a first part of the rotor-holding structure 73, for example, placed towards the outer side of the vehicle.

Said first part of the rotor-holding structure 73 comprises a first outer seat of the bearing 74 suitable to receive an outer bearing 75 between rotor and stator.

Said rotor-holding structure 73 comprises means of connection to a second part rotor-holding structure 76, for example, placed on the inner side towards the vehicle.

Said second part of the rotor-holding structure 76 comprises a second outer seat of the bearing 82 suitable to receive an outer bearing 83 between rotor and stator.

In accordance with an embodiment, said outer bearing 75 and said inner bearing 83 between the rotor and stator are placed, for example, with their rolling means 84, substantially radially aligned or, in other words, substantially at the same distance from the axis of rotation a-a, or substantially at a pre-defined radial distance from the air gap between rotor and stator.

In accordance with an embodiment, said outer bearing 75 and said inner bearing 83 between the rotor and stator are placed on opposite sides of the motor.

In accordance with an embodiment, said assembly comprises a disc brake disc 11 connected to said rim 2 avoiding that it connects directly to said first or second part of the rotor-holding structure 73, 76.

In accordance with an embodiment, said rotor 307 is selectively, removably and rigidly connected to the inner side 4 of said wheel rim 2, avoiding the interposition of elastic members or damping members.

In accordance with a further embodiment, an assembly 1 comprises a wheel rim 2 suitable to rotate around an axis of rotation a-a, defining an axial direction A-A, an orthogonal radial direction R-R, and a circumferential direction T-T orthogonal to the axial direction A-A and the radial direction R-R. Said wheel rim 2 has an outer side 3, opposite to the axis of rotation a-a, and an inner side 4, facing the axis of rotation a-a. Said rim is suitable to externally receive a tyre 5.

In accordance with an embodiment, said wheel rim forms internally a cylindrical chamber 54 of the wheel rim radially delimited by said inner side 4.

In accordance with an embodiment, a motor 306 comprises a rotor 307 and a stator 308. Said rotor 307 is supported, free to rotate, on said stator 308. Said motor 306 is housed in the said cylindrical wheel rim chamber 54 of said wheel rim 2.

In accordance with an embodiment, said motor 306 forms internally a cylindrical motor chamber 114 radially delimited by said stator 308.

In accordance with an embodiment, said assembly 1 also comprises a braking device 10, said device comprising a disc brake disc 11 having a radially outer edge 12 and a radially inner edge 13.

In accordance with an embodiment, said rotor 307 is selectively and removably connected to the inner side 4 of said wheel rim 2.

In accordance with an embodiment, said disc 11 is received in said cylindrical motor chamber 114.

In accordance with an embodiment, said disc 11 is removably connected with its outer edge 12 to said wheel rim 2 without being connecting to the motor, so as to avoid transmitting stresses (for example thermal and mechanical) and vibration directly to the motor during braking.

In accordance with an embodiment, said wheel rim 2 comprises at least one spoke 9 that protrudes towards the axis of rotation a-a. Said at least one spoke 9 comprises an end portion, or third length of a "C"-shaped section 36. Said third length 36 is folded so as to enter into the cylindrical motor chamber 114.

In accordance with an embodiment, said disc 11 is connected with its outer edge 12 to the end portion or third length 36 of the spoke that enters the motor chamber 114.

In accordance with an embodiment, said spoke 9, where its end portion, or third length 36 begins, comprises a flexure portion 115 suitable to avoid reducing the circumferential strength of the spoke and, at the same time, allow filtering the high-frequency vibrations from the braking action and to allow thermal compensation in case of overheating of the disc, forming a cooling bridge.

In accordance with an embodiment, said portion of spoke flexure 115 comprises a joint 116 which forms a localized reduction in thickness of the spoke.

In accordance with an embodiment, said portion of spoke flexure 115 comprises openings 117 that avoid reducing the circumferential strength, but allow filtering the high-frequency vibrations coming from the braking action and allow thermal compensation in case of overheating of the disc, forming a cooling bridge.

In accordance with an embodiment, the said wheel rim 2 is connected to said rotor 307 only on its side facing the outside of the vehicle, so that it can be removed without separating rotor 307 from stator 308.

In accordance with an embodiment, said wheel rim 2 is made in two parts 15, 16 selectively and removably connected with each other to form a wheel rim body 17.

In accordance with an embodiment, said disc is separable from said rim 2 avoiding separating said two parts 15, 16 of the rim connected to each other to form the wheel rim body 17.

In accordance with an embodiment, said wheel rim 2 has a through hole, or air feed ducts for inflating the tyre made in the rim 222, formed partly in said first part of the wheel rim 15 and partly in said second part of the wheel rim 16 so as to form sealing duct between the outer surface of the wheel rim 2 and the channel for holding the tyre 30 to put inflating fluid inside the tyre 5 when mounted on said rim 2.

In accordance with an embodiment, said through hole 222 connects with one end leading to the outside with an inflation valve 121.

REFERENCES

Assembly
1 Assembly
  Wheel Rim
2 Wheel Rim
3 Outer side of wheel rim
4 Inner side of wheel rim
5 Tyre
15 First part of the wheel rim that extends to form at least one spoke
16 Second part of wheel rim
8 Wheel rim body
9 At least one spoke
210 Axial guide
211 Guide surface
24 End-of-stroke axial stop of the axial guide
26 Seeger® ring
27 Radial annular groove
28 Shoulders of the tyre
29 Holding edge of tyre shoulders
30 Tyre holding channel
31 Gasket, for example, O-ring seal between the two rim parts
32 First radial wall, first part of rim that works to seal
34 Second radial wall, second part of rim that works to seal
35 Central length of the C-shaped section
36 Third length of the C-shaped section
37 Cooling opening
54 Cylindrical chamber formed internally by the wheel rim
56 Spoke groove
57 First seat of the first part or first half-rim of coupling to the motor
58 Second seat of the second part or second half-rim of coupling and housing of the motor
59 Annular radial extension of the second part or second half-rim
60 Opposite stop surface of the annular radial extension
61 Opposite stop surface of the annular radial extension
62 Stop counter-surface of the seat of the first part or first half-rim
65 First connection stud of the two half-rims
66 Through hole of the first part
67 Threaded hole of the second part
68 Second stud connecting the rim to the motor
69 Second through hole of the second part
113 Tyre
115 Spoke flexure portion
116 Joint—thickness reduction
117 Opening of the spoke flexure portion
121 Tyre inflation valve
  MOTOR—hub bracket—suspension
306 Motor
307 Rotor
308 Stator
120 Stator support
39 Rotor-holding structure
40 Stator-holding structure
41 Cylindrical stator support body
42 Inner surface of cylindrical stator support body
43 Outer surface of cylindrical stator support body
44 Central hollow area of cylindrical stator body
45 Portion of the suspension inside the wheel assembly
46 Suspension fixing loops
47 Cooling channels
48 Manifold where the cooling channels merge
49 Insert connected to the manifold
50 Vehicle cooling circuit
51 Plate support ring
52 Stator plates
53 Stator coils
55 Hub bracket
63 Rotor counter-surface for coupling to the rim
64 Active part of the rotor, for example, permanent magnets
70 Second threaded hole of the rotor
71 Side of the motor connected to the rim 72 Air chamber between the motor and wheel rim
73 first part of the rotor-holding structure
74 First outer bearing seat
75 Outer bearing between rotor and stator
76 second part of the rotor-holding structure
78 third connecting stud of the first and second part of the rotor-holding structure
79 Outer support ring of permanent magnets
80 Permanent magnets
81 third through hole of the second part of rotor
82 second outer bearing seat
83 inner bearing between rotor and stator
84 Rolling means of the bearings
85 Rolling thrust blocks of the rolling means
87 Suspension
88 Steering arms
89 O-rings between stator support and plate support ring
90 Grooves for O-rings
91 opposite sides of stator support
92 opposite sides of stator support
93 Lip sealing means
94 Annular body of the sealing means
95 Sealing lip
96 Lip-compressing O-ring
97 Circumferential groove
98 Sliding surface of the rotor
99 Free end portion of the lip
100 Lip protection ring
114 Cylindrical motor chamber
119 Stator support loops
  Brake
10 Braking device
11 Disc brake disc
12 Outer edge
13 Inner edge
14 Disc brake caliper
21 Active part of disc brake caliper
22 Guide counter-surface of the outer edge of the brake disc
23 Outer edge extensions of the disc
25 Side walls of the outer edge of the disc
38 Spring interposed between disc and spoke
101 Inner side caliper body
102 Outer side caliper body
103 Thrust means
106 Calibrated stem studs
107 braking surface of inner disc
108 braking surface of outer disc
109 Inner pad
110 Outer pad
111 Cylinder-piston unit
112 Electro-mechanical actuator
118 screws connecting the caliper to its support
150 Floating brake caliper bracket

The invention claimed is:

1. Wheel assembly for a vehicle, comprising:
a wheel rim suitable to rotate around an axis of rotation, defining an axial direction parallel or coincident with said axis of rotation, an orthogonal radial direction, and a circumferential direction locally coincident with a tangential direction orthogonal to the axial direction and the radial direction, said wheel rim having a radially outer side, or outer side, opposite the axis of rotation, and a radially inner side, or inner side, facing the axis of rotation, said rim being suitable to receive externally a tyre, and wherein said wheel rim forms internally a cylindrical chamber of the rim delimited radially from said inner side;
a motor comprising a rotor and a stator; said rotor being supported, free to rotate, on said stator; said stator being fixed to a stator support; said motor being housed in the said cylindrical wheel rim chamber of said wheel rim;
said rotor being selectively and removably connected rigidly to the inner side of said wheel rim, avoiding the interposition of elastic members or damping members between said rotor and said wheel rim;
said assembly also comprising a braking device, said device comprising a disc brake disc having a radially outer edge and a radially inner edge, said braking device further comprising a disc brake caliper selectively and removably connected, directly or indirectly, to said stator support, said disc brake caliper being placed with an active part astride the inner edge of said disc brake disc; wherein
said wheel rim is made in two parts selectively and removably connected to each other to form a wheel rim body, each of said two parts forms an annular holding edge, said holding edges cooperate with each other, when the two parts are connected to form the wheel rim body, forming in the radially outward direction, a channel for holding the tyre; and wherein
one of the two parts of said wheel rim forms in a single piece at least one spoke that protrudes radially towards the axis of rotation; and wherein
said disc is connected with its outer edge to said at least one spoke.

2. Assembly according to claim 1, wherein in said at least one rim:
a portion of said at least one spoke forms at least one axial guide defining at least one guide surface having at least one portion that extends along the axial direction; and/or wherein
said at least one axial guide defines at least one guide surface having at least one portion that extends along the radial direction; and/or wherein
said disc is removably connected with its outer edge to said at least one spoke; and/or wherein
said disc is connected slidingly with its outer edge to said at least one spoke; and/or wherein
said disc comprises on said outer edge at least one guide counter-surface that cooperates with said guide surface to allow said disc to slide in the axial direction, said guide counter-surface cooperating with said guide, creating a support that extends in the axial direction for the free sliding of the disc brake disc; and/or wherein
said disc, comprises, on said its outer edge, at least one guide counter-surface that cooperates, with at least one of its portions, with a portion that extends along the radial direction; and/or wherein
said guide counter-surface, cooperates with said guide and creates a support in tangential or circumferential direction; and/or wherein
a portion of said at least one spoke forms at least one axial guide defining at least one guide surface directed along the axial direction; said disc being geometrically coupled with its outer edge with said axial guide to make said disc slidable or floatable in axial direction and, at the same time, to abut said outer edge of the disc against abutment surfaces provided in said guides for the tangential support of the disc during the braking action; and/or wherein said disc comprises in said its outer edge, at least one geometrical-coupling radial extension with at least one seat forming guide surface provided in said at least one spoke; and/or wherein said disk comprises at least one radial extension that protrudes radially away from said axis of rotation, said at least one radial extension forming a guide counter-surface that extends in the axial direction and in radial direction, or a direction parallel to the radial direction, forming an abutment counter-surface or tangential stop, said at least one spoke comprises at least one groove that forms at least one guide surface that extends in the axial direction and in radial direction, or a direction parallel to the radial direction, forming an abutment surface or tangential stop, said at least one extension is received in said at least one groove so as to face said guide counter-surface to said guide surface, so that during a braking action, said guide counter-surface goes in abutment or stops against said guide surface; and/or wherein said at least one spoke are a plurality of spokes, preferably, but not necessarily, distributed circumferentially; and/or wherein said at least one guide surface are a plurality of guide surfaces and said at least one guide counter-surface are a plurality of guide counter-surfaces, preferably, but not necessarily, circumferentially distributed; and/or wherein said at least one guide surface are a plurality of opposing guide surfaces and said at least one guide counter-surface are a plurality of guide counter-surfaces, preferably, but not necessarily, circumferentially distributed; and/or wherein a portion of said at least one spoke forms at least one axial guide coupled geometrically with the outer edge of said disc for the sliding or floating movement along an axial direction of said disc, said axial guide comprising at least one axial end-of-stroke stop, and/or wherein said axial end-of-stroke stop forms an annular surface extending radially to form an axial stop for the annular portions of the side walls of the outer edge of the disc; and/or wherein said at least one axial end-of-stroke stop is obtained with a retaining ring, partially received in an annular radial groove formed in said at least one axial guide; and/or wherein between said disc and said spoke is interposed a spring; and/or wherein said at least one spoke are a plurality of spokes circumferentially distributed in such a number as to allow guiding, without jamming, the floating movement of the disc brake disc and/or limiting, within pre-defined values, the stress per unit of area transmitted from the brake disc to the wheel rim during the braking action; and/or wherein said two parts, or outer half-rim and inner half-rim, are selectively and removably connected to each other to form a rim body, each forming a single annular holding edge extended substantially circumferentially; and/or wherein said tyre has circumferential shoulders for coupling to the rim and said two parts, or outer half-rim and inner half-rim, selectively and removably connected to each other to form a rim body, each forming a single holding edge to hold the shoulders of said tyre; and/or wherein each of said two parts form an opposite annular holding edge, said opposed edges cooperate with each other, when the two parts are connected to form the body of the wheel rim, forming in radially outward direction the channel for holding the tyre; and/or wherein a gasket is interposed between said two parts, selectively and removably connected to form a rim body, to allow the use of tires without tube, or tubeless, and prevent the escape of pressurized gases from the chamber formed between the channel of the rim and the inside of the tyre; said gasket is an O-ring arranged between two circumferentially and axially extended surfaces of said two parts of the rim overlapping one another in the radial direction so as to create a seal between these two parts but avoid the gasket being excessively stressed by tightening in the axial direction between the two parts of the rim; and/or wherein said first part, or the first half-rim or outer half-rim, forms in a single piece at least one spoke and is the part placed outside of a vehicle; and/or wherein said first part has, in at least one of its sections, a section made along a radial-axial plane, with substantially a "C" shape, with its concavity facing towards the inside of the assembly, forming with a first length of the "C"-shaped section, a holding portion for the tyre, with a second central length of the "C"-shaped section, the at least one spoke, and with a third length of the "C"-shaped section, at least one axial guide for supporting said disc of the disc brake in rotation with said wheel rim; and/or wherein said third length comprises, in one of its portions external to said support portion of the disc, at least one cooling opening suitable to allow the radial outflow of cooling air circulating in the vicinity of the disc brake disc; and/or wherein said first part, or first half-rim, comprises a first seat for partially coupling and receiving the motor; and/or wherein said second part, or second half-rim, comprises a second seat for partially coupling and receiving the motor; and/or wherein said second part, or second half-rim, comprises an annular radial extension that forms a stop surface and an opposite stop surface; and/or wherein said first part, or first half-rim, comprises a stop counter-surface; and/or wherein said stop counter-surface of said first part, or first half-rim, is suitable to abut against said stop counter-surface of said second part or second half-rim; and/or wherein said rotor of said motor comprises a rotor counter-surface suitable to abut against said opposite stop counter-surface of said annular radial extension; and/or wherein said first part, or first half-rim, is connected to said second part, or second half-rim, by at least a first stud received in a through hole provided in the first part, or first half-rim, and screwed into an aligned threaded hole provided in the second part, or second half-rim; and/or wherein said at least one first stud are a plurality of studs received in respective threaded through holes; and/or wherein at least one second stud connects said wheel rim to said motor, and/or wherein said at least a second stud is received in a through hole provided in the first part, or first half-rim, and an aligned second through hole provided in the second part, or second half-rim, said second stud being screwed in an aligned second threaded hole provided rotor of motor; and/or wherein said at least one second stud are a plurality of second studs received in respective aligned through holes, second through holes and second threaded holes; and/or wherein said first studs are circumferentially intercalated by one or more second studs, and/or wherein said at least one second stud is radially aligned with said at least one spoke, so that the connection of the rotor of the motor to the wheel rim occurs at a point of the rim of greater thickness or strength; and/or wherein said motor is connected to said rim in the vicinity of one of its sides, remaining cantilevered towards the inside of the rim, leaving a cavity or air chamber between the motor and the inner side of the rim, said gap or air chamber being open allowing the escape, from the assembly of the wheel, of the heat produced by the motor during its operation and avoiding that the heat dangerously raises the temperature of the rim, the tyre and especially the motor and the braking device; and/or wherein the engine is connected only via one side to the rim forming a chamber between the motor rotor and the inner side of the wheel, wherein said gap or air chamber allows avoiding the direct transmission of stresses from the wheel rim body to the rotor.

3. Assembly according to claim 1, wherein in said motor comprises:

a rotor-holding structure that receives an active part of the rotor suitable to firmly but removably connecting to the wheel rim in such a way as to extend inside the rim remaining firmly fixed and substantially cantilevered; and/or wherein said rotor-holding structure comprises a first part of the rotor-holding structure; and/or wherein said first part of the rotor-holding structure comprises means for connection to the rim, including a threaded second hole of rotor suitable to receive a second stud connecting the rim to motor; and/or wherein said first part of the rotor-holding structure comprises a first outer seat of bearing suitable to receive an inner bearing between the rotor and stator, said outer seat of a bearing is a seat having a cross section substantially with an "L" shape so as to allow the fitting of said inner bearing; and/or wherein said first part of the rotor-holding structure comprises means of connection to a second part of the rotor-holding structure placed on the inner side facing the vehicle said connection means are a third threaded hole suitable to receive a third stud connecting the first and second part of the rotor-holding structure; and/or wherein said first part of the rotor-holding structure is connected to said second part of the rotor-holding structure, pack clamping between them said active part of the rotor, an outer support ring for additional permanent magnets suitable for supporting additional permanent magnets so that the additional permanent magnets may be mounted circumferentially in the rotor, but are not subjected to mechanical stress during the pack closure of the two parts of the holding structure and so that all the magnets maintain the correct radial arrangement relative to the stator; and/or wherein said second part of rotor-holding structure comprises a third through hole suitable to receive the third stud connecting the first and second part of the rotor-holding structure; and/or wherein said second part of the rotor-holding structure comprises a second outer seat of a bearing suitable to receive an inner bearing between the rotor and stator, said outer seat of bearing is a seat having a cross section substantially with an "L" shape so as to allow the fitting of said inner bearing; and/or wherein said outer bearing and said inner bearing between the rotor and stator are placed with their rolling means, substantially radially aligned or, in other words, substantially at the same distance from the axis of rotation, substantially radially aligned with each other at a pre-defined radial distance from an air gap between rotor and stator; and/or wherein said outer bearing and said inner bearing between the rotor and stator comprise rolling thrust blocks of the rolling means made of aluminium, surface hardened so as to reduce the wear of rolling tracks of rolling means formed in thrust blocks and, at the same time, to be particularly light being arranged as a non-suspended mass of the vehicle and, thus, subjected to accelerations at high frequency due to shocks to the assembly during the rolling of the tyre on the road; and/or wherein said outer bearing, in particular its outer thrust block, is arranged axially between said first part of rotor-holding structure and said first part of the wheel rim that extends to form at least one spoke; and/or wherein said inner bearing, in particular its outer thrust block, is arranged between said second part of rotor-holding structure and a holding ring; and/or wherein said motor comprises a stator-holding structure comprising said stator support and a support ring for stator plates; and/or wherein said stator support comprises a cylindrical body having an inner surface and an outer surface, said cylindrical body form a hollow central area suitable to receive a portion of a suspension and its connection to said cylindrical stator support body; and/or wherein connected to said inner surface of stator body, there are securing loops for connecting to the suspension, a hub bracket and/or steering arms; and/or wherein said hollow central area is suitable to receive said disc brake disc connected to said at least one spoke of wheel rim; and/or wherein said stator support comprises cooling channels forming a circulation path for coolant; and/or wherein said cooling channels are formed in said outer surface of the cylindrical stator support body, said channels extending circumferentially between them remaining parallel to form independent cooling paths, said cooling channels converge in a manifold which is connected to an insert for connection to a cooling circuit of the vehicle; and/or wherein said cooling channels are closed by a stator plate support ring around which the stator coils are arranged so as to lap, with the coolant that runs through said channels, the active part of said stator; and/or wherein between said plate support ring and said stator support, there are sealing means, such as O-rings placed in grooves provided externally in the stator support body and on both sides of the cooling channels, to prevent the loss of the coolant from said channels; and/or wherein said cylindrical body of said stator support comprises opposite sides of the stator support and wherein there are provided sealing means placed between the stator and rotor, protecting bearings, said sealing means being connected to said opposite stator sides; and/or wherein said sealing means between stator and rotor comprise a ring-shaped body of the sealing means to which is associated a sealing lip, wherein said sealing lip is closed in a pack between said ring-shaped body and the side supporting the stator, and preferably, said side support of the stator comprises a circumferential groove side in which is partially received a lip-compressing O-ring which clamps said sealing lip in a pack against said ring-shaped body of the sealing means, wherein said lip is arranged so as to rest sealingly resting with a its free end portion laterally on a sliding surface of the rotor, preventing the entry of substances harmful to the operation of the bearing in the bearing, as well as avoiding the leakage of lubricating means of the bearing from the bearing itself; and/or wherein said sealing means are fixed by screws to the sides of the stator support; and/or wherein the sealing means on the side that faces the outside of the vehicle are interposed between the stator support body and the outer rim or first part of the wheel rim; and/or wherein the sealing means, placed on the side that faces the outside of the vehicle, comprise a ring that protects the lip that, from the ring-shaped body of the sealing means, protrudes and partially one of its free ends faces without contact an inner side of the rotor; and/or wherein said ring-shaped body of the sealing means pack clamps the inner thrust block of the bearings against the stator support body and/or plate support ring.

4. Assembly according to claim 1, wherein said disc brake disc is bound tangentially to said outer rim or the first part of the wheel rim remaining free to move in axial direction; and/or wherein said disc is constrained in the axial direction by the disc brake caliper placed astride its inner edge; and/or wherein said disk brake caliper is of the fixed type and comprises a inner side caliper body and an outer side caliper body, said inner side caliper body houses thrust means suitable to abut inner pads against the inner braking surface of the disc suitable to slide axially with respect to the spokes of the wheel rim and abut against outer pads housed in said outer caliper body, and/or wherein said inner side caliper body is made in one piece or firmly fixed to a hub bracket; and/or wherein said inner side caliper body houses thrust means arranged facing an inner disc braking surface facing towards the vehicle; said thrust means act on an inner pad supported to said inner side caliper body, or preferably supported to a bracket, to abut against the inner disc braking surface; and/or wherein said outer side caliper body is removably connected by means of studs with calibrated stems, to said inner side caliper body, said outer side caliper body being arranged externally facing an outer braking surface of the disc, facing towards the opposite part of the vehicle; said inner side caliper body supports an external pad suitable to abut against the outer braking surface of the disc; and/or wherein said outer side caliper body is removably connected to said inner side caliper body so as to be able to be separated from the inner side caliper body avoiding disassembling the rim and/or avoiding removing the motor from the wheel rim; and/or wherein said thrust means are thrust means for the generation of a service braking action; and/or wherein joined to said service thrust means, there is a parking thrust unit or parking function.

5. Assembly according to claim 1, wherein said disc is connected removably with its outer edge to said at least one spoke free to slide or float during its operation in the axial direction.

6. Assembly according to claim 1, wherein said motor comprises:

a rotor-holding structure that receives an active part of the rotor suitable to firmly but removably connecting to the wheel rim, in such a way as to extend inside the rim remaining firmly fixed and substantially cantilevered; and wherein said rotor-holding structure comprises a first part of the rotor-holding structure; and wherein said first part of the rotor-holding structure comprises a first outer seat of a bearing suitable to receive an outer bearing between the rotor and stator; and wherein said rotor-holding structure comprises means of connection to a second part rotor-holding structure; and wherein said second part of the rotor-holding structure comprises a second outer seat of the bearing suitable to receive an outer bearing between the rotor and stator; and/or wherein said outer bearing and said inner bearing between the rotor and stator are placed with their rolling means, substantially radially aligned or, in other words, substantially at the same distance from the axis of rotation, or substantially radially aligned with each other at a pre-defined radial distance from an air gap between the rotor and stator; and/or wherein said outer bearing and said inner bearing between the rotor and stator are placed on opposite sides of the motor; and/or wherein said assembly comprises a disc brake disc connected to said rim avoiding that it connects directly to said first or second part of the rotor-holding structure; and/or wherein said rotor is selectively, removably and rigidly connected to the inner side of said wheel rim, avoiding the interposition of elastic members or damping members.

7. Assembly according to claim 1, wherein said motor internally forms a cylindrical wheel rim chamber radially delimited by said stator;

said assembly also comprising a braking device, said device comprising a disc brake disc having a radially outer edge and a radially inner edge, wherein said rotor is selectively and removably connected to the inner side of said wheel rim;

wherein said disc is received in said cylindrical motor chamber; and wherein said disc is removably connected with its outer edge to said wheel rim without being connecting to the motor, so as to avoid transmitting stresses and vibration directly to the motor during braking, and/or wherein said wheel rim comprises the at least one spoke that protrudes toward the axis of rotation, wherein said at least one spoke comprises an end portion, or a third length of a C-shaped section, wherein said third length is folded so as to enter into the cylindrical motor chamber; and/or wherein said disc is connected with its outer edge to the end portion or third length of the spoke that enters the motor chamber and/or wherein said spoke where its end portion, or the third portion begins, comprises a portion of a flexure suitable to avoid reducing the circumferential strength and allow filtering the high-frequency vibrations from the braking action, and allows thermal compensation in the event of overheating of the disc, and forming a cooling bridge and/or wherein
  a portion of the spoke flexure comprises a joint which forms a localized reduction in thickness of the spoke and/or wherein
  said portion of the spoke flexure comprises openings that avoid reducing the circumferential strength, but allow filtering the high-frequency vibrations coming from the braking action and allow thermal compensation in case of overheating of the disc, forming the cooling bridge; and/or wherein
  said wheel rim is connected to said rotor only on its side facing the outside of the vehicle, so that it can be removed without separating the rotor from the stator; and/or wherein
  said disc is separable from said rim avoiding separating said two parts of the rim connected to each other to form the wheel rim body.

8. Wheel assembly for a vehicle, comprising:
  a wheel rim suitable to rotate around an axis of rotation, defining an axial direction, an orthogonal radial direction, and a circumferential direction orthogonal to the axial direction and the radial direction, said wheel rim has an outer side, opposite to the axis of rotation, and an inner side facing the axis of rotation, said rim being suitable to externally receive a tyre; said wheel rim forms internally a cylindrical chamber of the wheel rim radially delimited by said inner side;
  said assembly also comprising a braking device, said device comprising a disc brake disc having a radially outer edge and a radially inner edge, and disc brake caliper selectively and removably connected directly or indirectly to a stator support or a hub bracket and being placed with an active part astride the inner edge of said disc brake disc; wherein
  said wheel rim is made in two parts selectively and removably connected with each other to form a wheel rim body; and wherein
  one of the two parts of said wheel rim forms in a single piece at least one spoke that protrudes radially towards the axis of rotation; and wherein
  said disc is removably connected with its outer edge to said at least one spoke; and wherein
  said disc is connected removably with its outer edge to said at least one spoke free to slide or float during its operation in the axial direction.

* * * * *